Jan. 29, 1946.  A. L. DE SPAIN  2,393,617
BUNDLE TRIMMER MECHANISM
Filed Oct. 2, 1942  10 Sheets-Sheet 1

INVENTOR
Augustus L. De Spain
BY
Arnold & Mathie
ATTORNEY

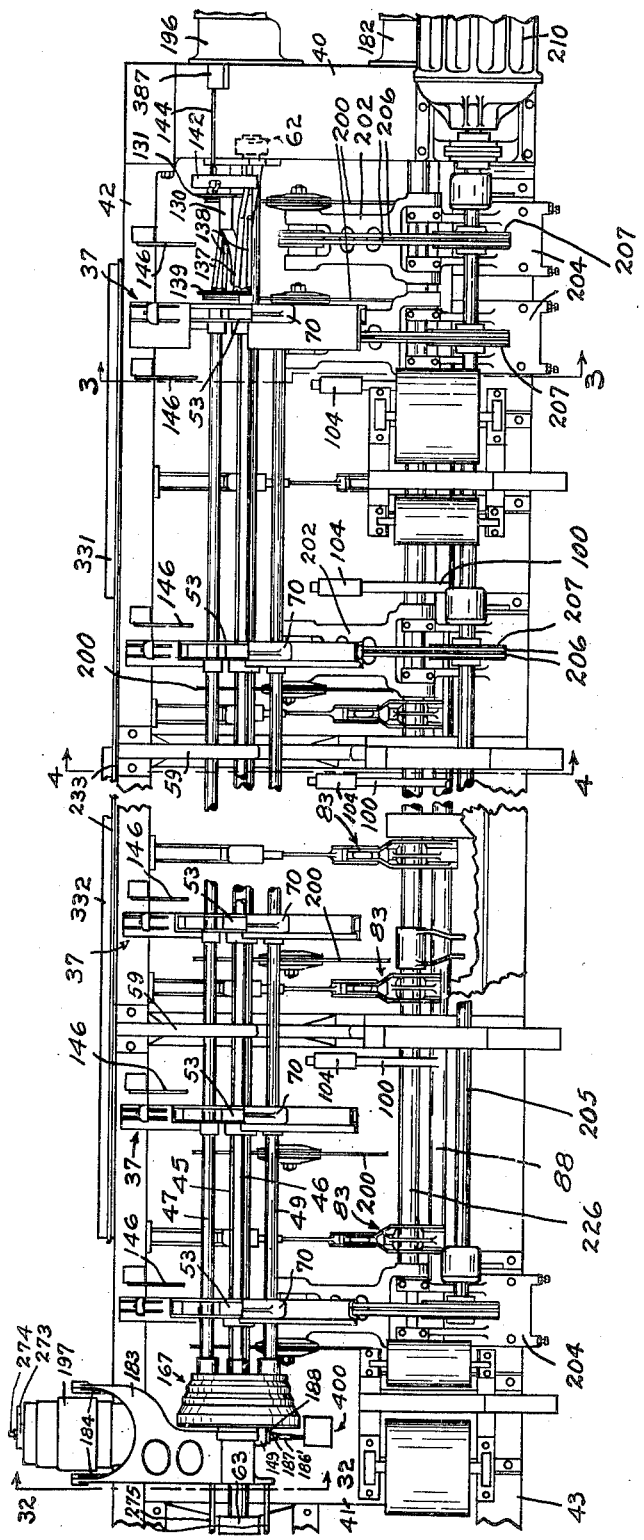

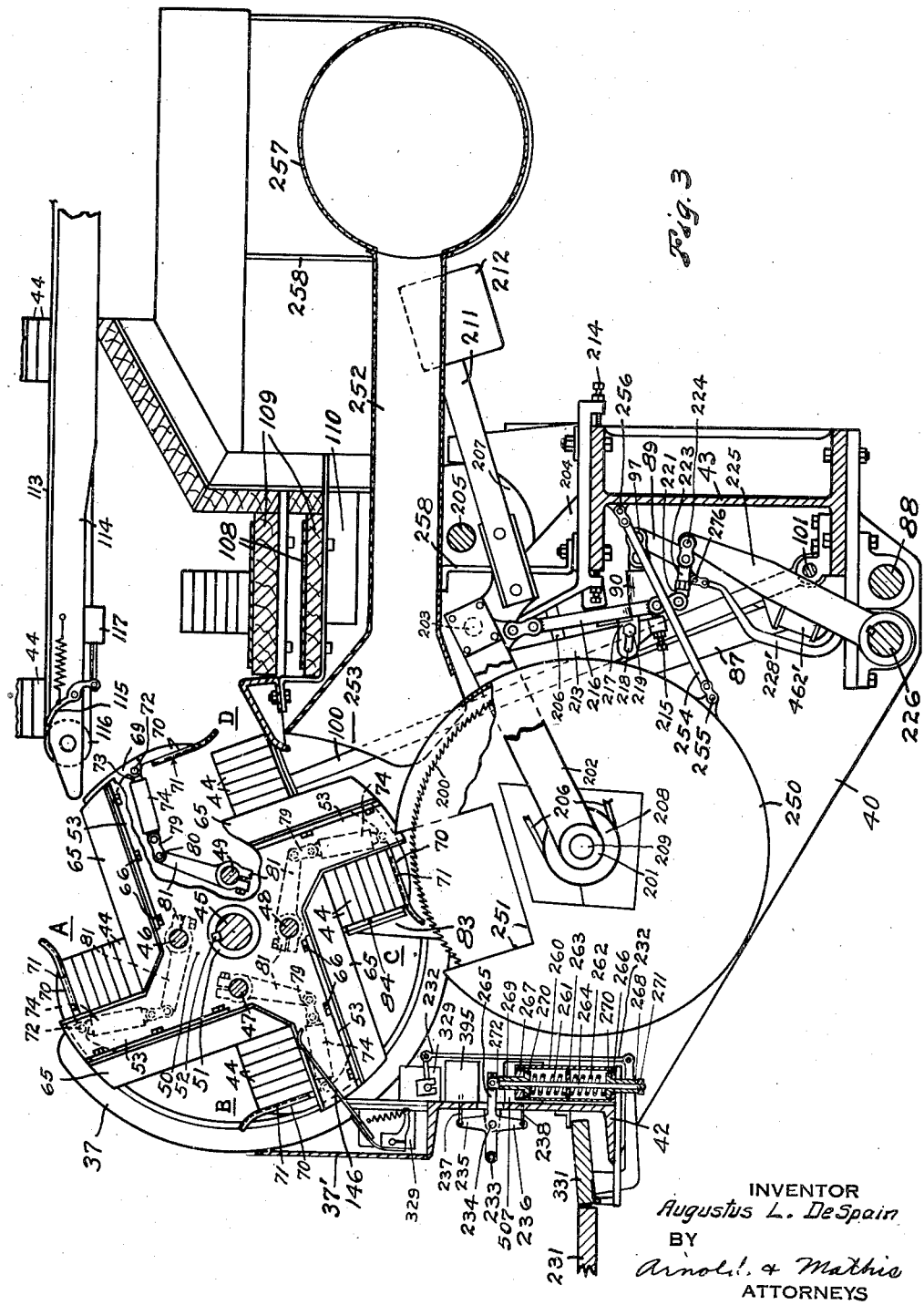

Jan. 29, 1946.  A. L. DE SPAIN  2,393,617
BUNDLE TRIMMER MECHANISM
Filed Oct. 2, 1942  10 Sheets-Sheet 4
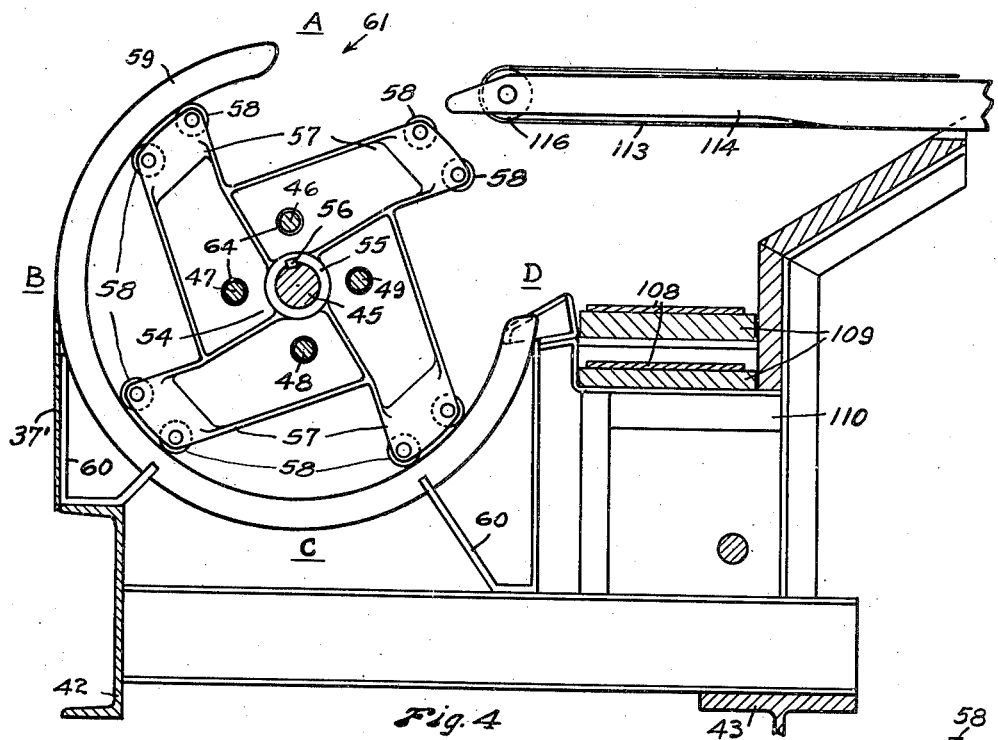
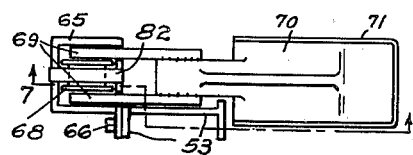
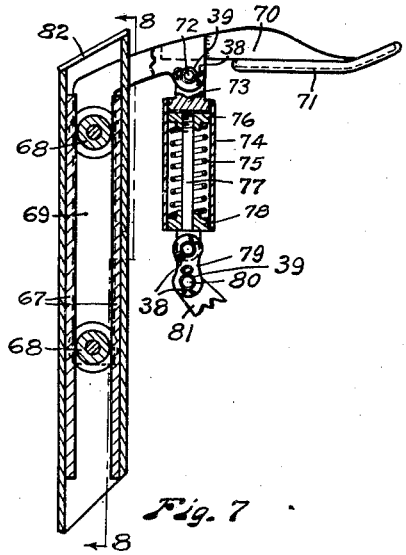
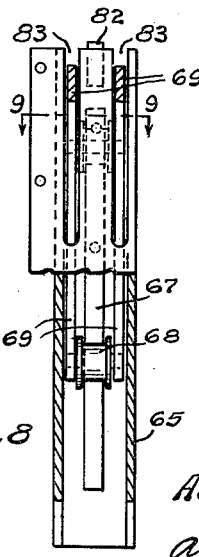
INVENTOR
Augustus L. DeSpain
BY
Arnold & Mathis
ATTORNEYS

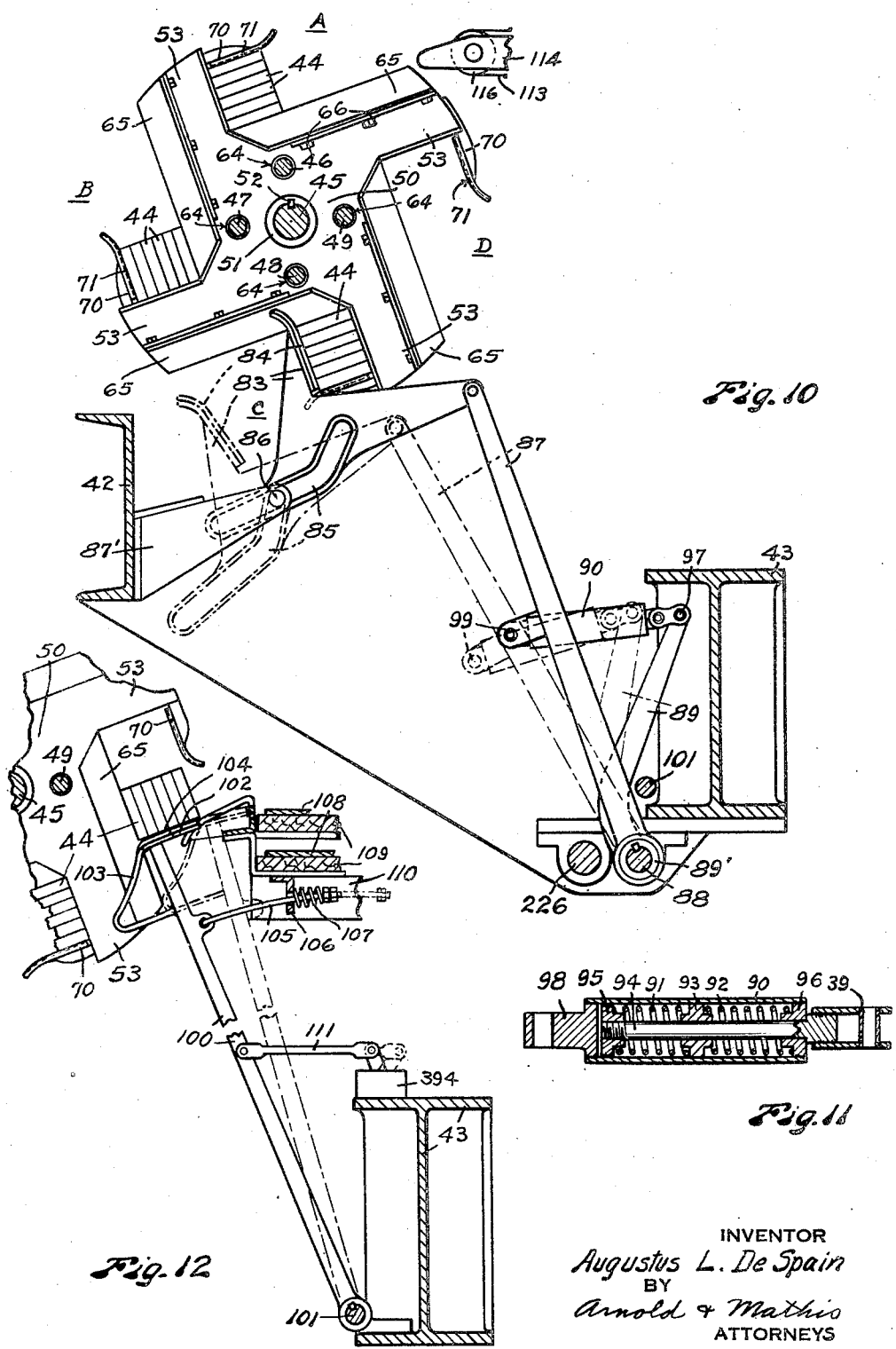

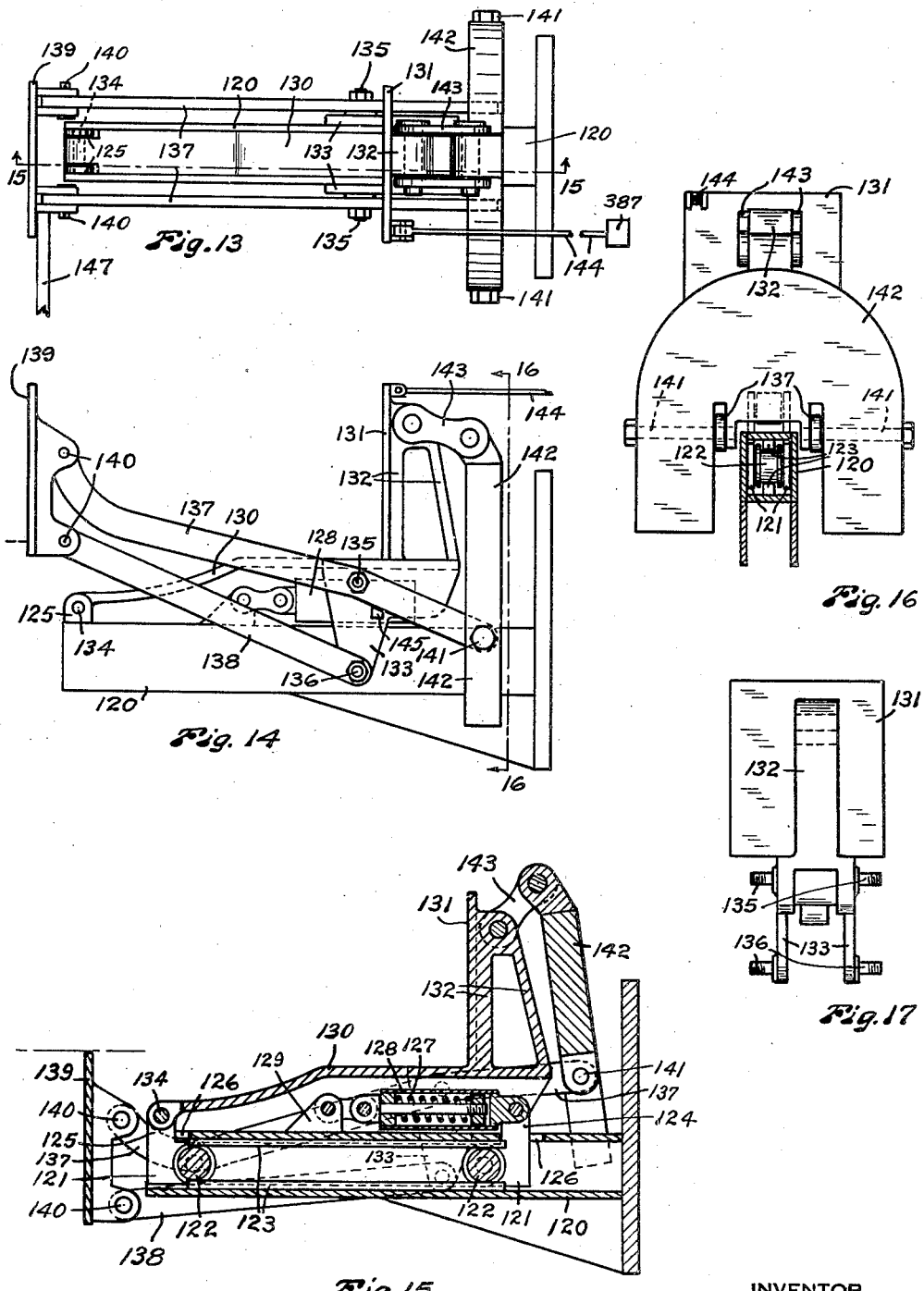

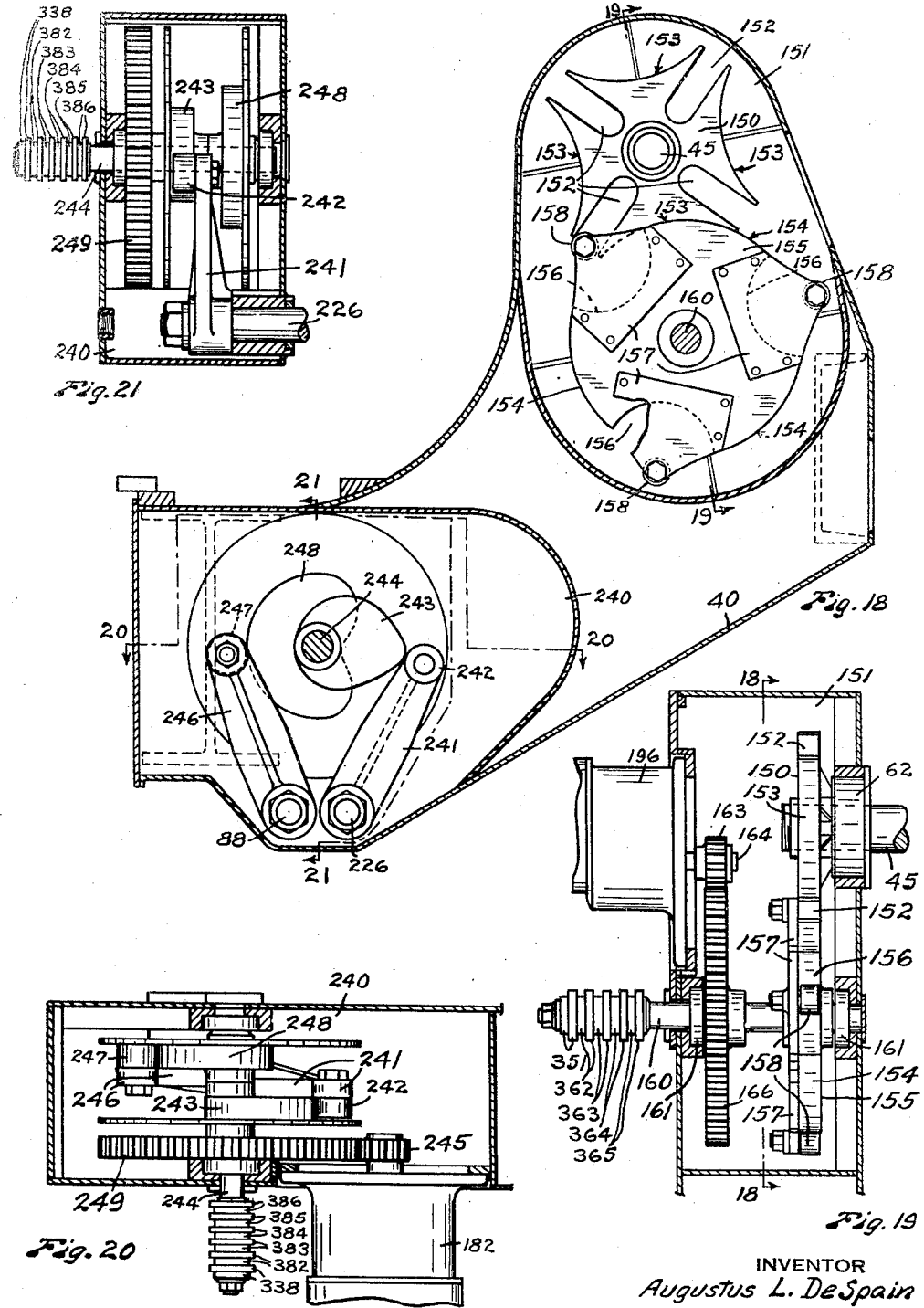

Jan. 29, 1946.     A. L. DE SPAIN     2,393,617
BUNDLE TRIMMER MECHANISM
Filed Oct. 2, 1942     10 Sheets-Sheet 8
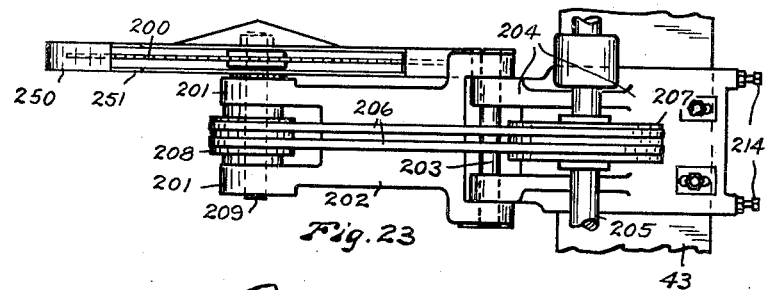
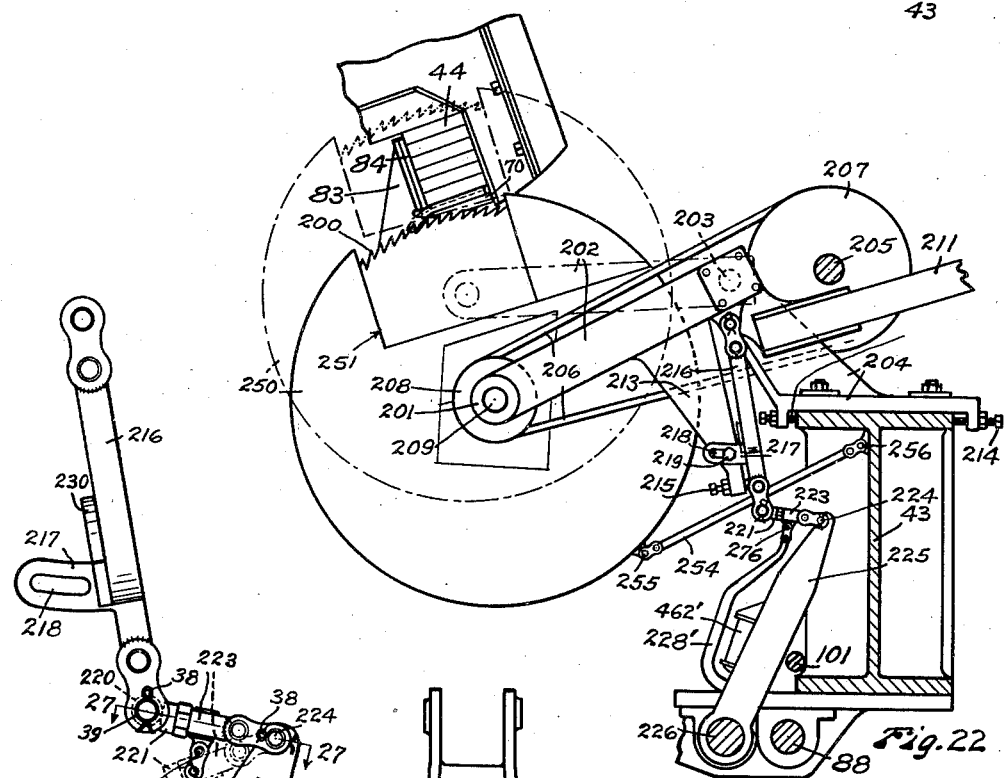
INVENTOR
Augustus L. De Spain
BY
Arnold & Mathis
ATTORNEYS Jan. 29, 1946.  A. L. DE SPAIN  2,393,617
BUNDLE TRIMMER MECHANISM
Filed Oct. 2, 1942  10 Sheets-Sheet 9

INVENTOR
Augustus L. De Spain
BY
Arnold + Mathis
ATTORNEYS

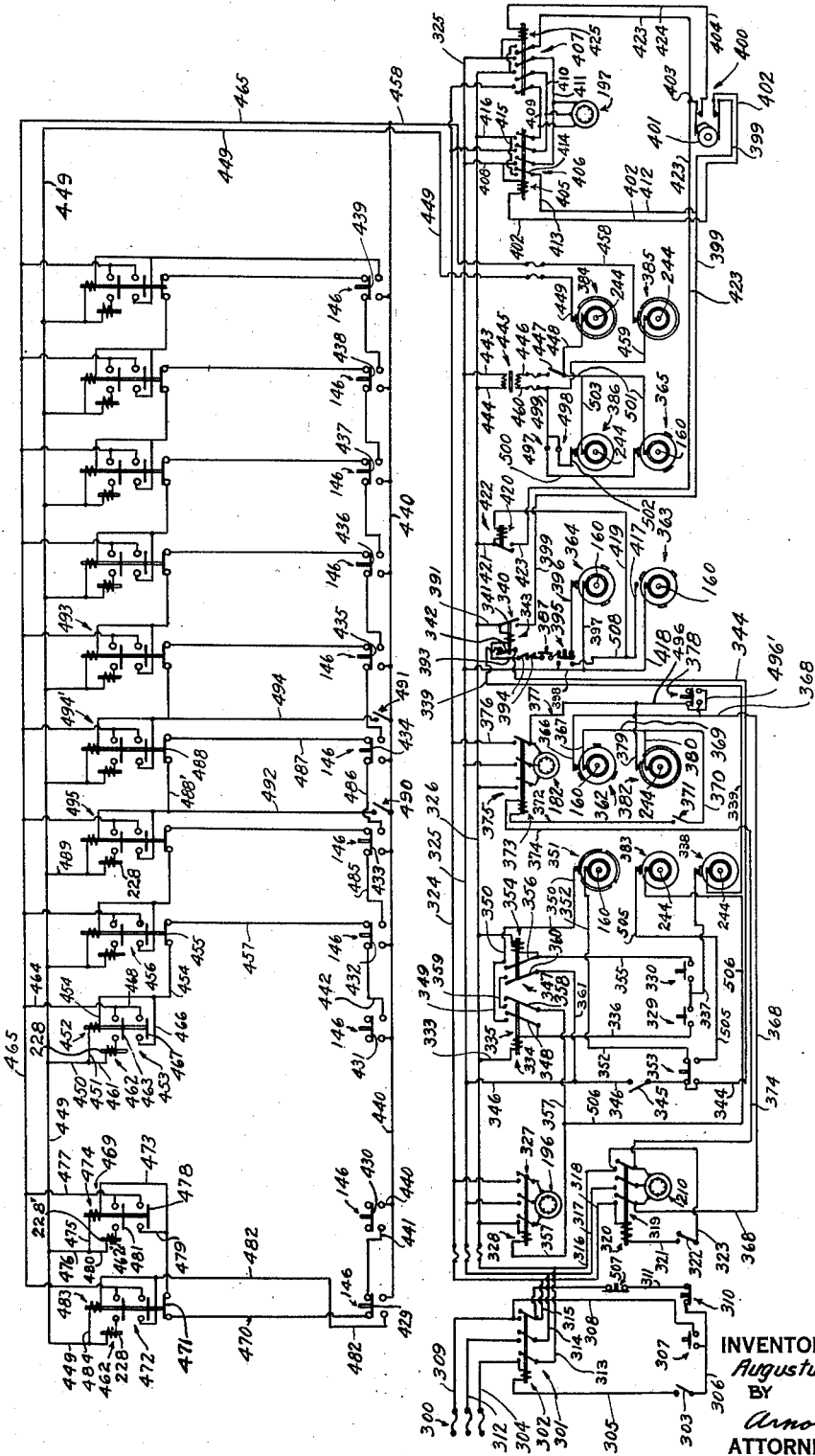

Patented Jan. 29, 1946

2,393,617

UNITED STATES PATENT OFFICE 2,393,617

BUNDLE TRIMMER MECHANISM

Augustus L. De Spain, Enumclaw, Wash., assignor to White River Lumber Company, Enumclaw, Wash., a corporation of Washington Application October 2, 1942, Serial No. 460,533

18 Claims. (Cl. 143—41)

This invention relates to machines for holding bundled lumber while it is being tied, and for squaring and end trimming said burdled lumber to accurate, measured lengths.

A primary object of the invention is to provide a machine which will accurately square a bundle of lumber, securely clamp the bundle of lumber while in such squared position, and smoothly and accurately end trim both ends of the bundle. A further primary object of the invention is to provide a machine to operate upon random length bundles of lumber and to trim the said bundles to an accurate longitudinal length depending upon the original random length of the bundle, all in a minimum time, and with a minimum effort of the operators, and with a minimum waste of lumber.

Another primary object of the invention is to provide a random length bundle trimming machine having means for supporting, clamping, and holding a plurality of pieces of lumber in bundle form in a convenient position in which bundle securing means, as tie members, may be readily applied thereto.

Another primary object of the invention is to provide reciprocating rotatable saw means for simultaneously trimming both ends of random length bundles of lumber at the same time.

Another primary object of the invention is to provide a plurality of rotating saws which may be reciprocated or stroked through the path of the lumber bundle and having means responsive to the individual length of random length bundles so that the individual length of each bundle will determine or select the two saws to be reciprocated and end trim the bundle to the maximum standard length obtainable from said bundle.

Another primary object of the invention is to provide a random length bundle trimming machine in which the bundles are moved in a circular path and are successively clamped, tied, squared, end trimmed at both ends while securely clamped, and discharged from the machine.

Another object of the invention is to provide a machine having the majority of its rotating saws spaced at two foot intervals, but having at least two saws spaced at a one foot interval whereby the machine is capable of cutting bundles to standard lengths as measured in both odd and even numbered feet.

Another object of the invention is to provide control and safety means so as to eliminate the possibility of the stroking of any more saws than the two required to end trim an individual bundle to the maximum standard length obtainable therefrom.

Another object of the invention is to provide clamp means for securely clamping and holding a bundle from all four sides and at frequent intervals so that all of the boards thereof will be accurately aligned and securely held in such a manner that they may be squarely end trimmed to a very accurate length.

Another object of the invention is to provide bundle straightening means which are movable into contact with bundles for straightening the bundles and movable out of the path of the bundles as the bundles revolve.

Another object of the invention is to provide a random length bundle trimming machine wherein two operators may apply the securing or tie means to the lumber, and having means whereby the starting of the machine is under the joint control of both operators—whereby the machine cannot be started until both operators have satisfactorily completed their tieing operation—and have each operated a starting switch, thus permitting coordination of their efforts and permitting either operator, in the event of human error, the breaking of the tie member or the like, to delay operation of the machine until the bundle in the station where it is tied is ready to be advanced to the succeeding stations.

Another object of the invention is to provide a random length bundle trimming machine having control means adapted to stop the machine after a predetermined period of operation after the machine has been started manually by the operators.

It is a further object of the invention to provide a bundle holding rotor having a plurality of bundle holding members mounted thereon and which bundle holding rotor operates for a predetermined portion of a revolution after being started by the operators.

It is a further object of the invention to provide a bundle holding rotor which has bundle supporting members thereon and onto which a bundle may be moved for clamping and then tieing by the operators.

Another object of the invention is to provide a bundle trimmer having a bundle holding rotor adapted to move bundles of lumber in a circular path and in which the bundles of lumber are loaded into the upper portion of the rotor by moving them toward the operators who stand at one side of the machine, and in which the bundles are carried around in a circular path by intermittent movements of the rotor and are finally discharged from the rotor at the opposite side of the machine from the operators.

It is a further object of the invention to provide a bundle trimmer which is readily adjustable to accommodate bundles of lumber of different sizes.

It is a further object of the invention to provide a random length bundle trimmer in which the bundles are delivered to the machine transverse of their length and are discharged from the machine in the same relative position so that a long bundle can be loaded into the machine and discharged therefrom as quickly as a short bundle and so that random length bundles, regardless of their length, will travel into and be discharged from the bundle trimmer at the same side and at a maximum rate of speed.

It is a further object of the invention to provide a random length bundle trimming machine in which two rotating saws are stroked to saw both ends of the bundle at the same time and with the saws guarded and arranged to provide utmost safety to the operators.

Another object is to provide a bundle trimming machine in which more than two saws may be stroked simultaneously to end trim a bundle and, at the same time, cut said bundle into two or more lengths.

Another object of the invention is to provide a bundle trimming machine in which the saws are stroked to trim one bundle while another bundle is being loaded into the rotor and tied, thereby allowing ample time for a relatively slow stroking of the saws without slowing up the operation of the machine, this relatively slow stroking of the saws insuring a better and smoother end trimming cut with minimum splintering of the trimmed ends of the boards.

It is a further object of the invention to provide a random length bundle trimming machine which will fit into the line of production of present day standard lumber mill operations having a size and dimension which will permit its use without substantial rebuilding of lumber mills as we find them today, and to further provide such a machine which can be very quickly and easily installed in a present day lumber mill thus minimizing interference with production of lumber in the mill at the time the machine is installed.

It is a further object of this invention to provide a bundle trimming machine in which a rotating saw is provided at every location where an end trim is to be made on a bundle, thus avoiding movement of saws longitudinally of the machine, the result being a speeding up in the operation of the machine due to the fact that it takes a substantial amount of time to move a rapidly rotating saw longitudinally of its arbor to a new operating position.

It is a further object of the invention to provide a random length bundle trimming machine in which pneumatic controls are entirely eliminated and in which all of the controls are electric and in which adequate safety devices are provided for preventing damage of any nature in the event any of the electric controls or devices fail to function properly.

The above mentioned general objects of this invention together with others inherent in the same, are attained by the mechanism illustrated in the following drawings, the same being a preferred exemplary form of embodiment of my invention, throughout which drawings like reference numerals indicate like parts:

Fig. 2 is a fragmentary plan view of said automatic bundle trimmer, parts being broken away and other parts being omitted;

Fig. 3 is a sectional view of said automatic bundle trimmer taken substantially on broken line 3—3 of Fig. 2 and on a larger scale than Fig. 2;

Fig. 4 is a fragmentary view partly in section and partly in elevation taken substantially on broken line 4—4 of Fig. 2, and showing the bearing for the bundle rotor, parts being omitted;

Fig. 5 is a detached elevation of a bearing spider;

Fig. 6 is a detached plan view of a bundle clamping device;

Fig. 7 is a view partly in section and partly in elevation of said bundle clamping device taken substantially on broken line 7—7 of Fig. 6;

Fig. 8 is a view partly in section and partly in elevation taken substantially on broken line 8—8 of Fig. 7;

Fig. 9 is a view in cross section taken on broken line 9—9 of Fig. 8, and showing the arm to which the bundle clamping device is secured;

Fig. 10 is a fragmentary view partly in section and partly in elevation and with parts omitted, showing bundle side-clamping means;

Fig. 11 is a detached sectional view of a resilient link used in said bundle side-clamping means;

Fig. 12 is a fragmentary view partly in section and partly in elevation and with parts omitted, showing a bundle support or drop-arm structure;

Fig. 13 is a plan view of a bundle bumper;

Fig. 14 is a side elevation of said bundle bumper;

Fig. 15 is a sectional view of said bundle bumper taken substantially on broken line 15—15 of Fig. 13 and showing one bundle stop plate in a depressed position;

Fig. 16 is a sectional view of said bundle bumper, with parts in elevation, taken substantially on broken line 16—16 of Fig. 14;

Fig. 17 is a detached end elevation of a bumper plate used in said bundle bumper;

Fig. 18 is a sectional view substantially on broken line 18—18 of Fig. 19, and through an end frame member showing Geneva stop means for controlling movement of a bundle rotor and showing cam means for controlling the operation of side clamp devices and other cam means for controlling the stroking of saws;

Fig. 19 is a sectional view, with parts in elevation, taken substantially on broken line 19—19 of Fig. 18;

Fig. 20 is a sectional view, with parts in elevation, taken substantially on broken line 20—20 of Fig. 18;

Fig. 21 is a sectional view, with parts in elevation, taken substantially on broken line 21—21 of Fig. 18;

Fig. 22 is a fragmentary view partly in section and partly in elevation and with parts omitted showing saw mounting and saw stroking means;

Fig. 23 is a detached plan view of a saw and mounting means therefor;

Fig. 24 is a detached elevation on a larger scale than Fig. 22 of parts of the saw stroking mechanism;

Fig. 25 is a fragmentary view of the upper end portion of a power arm shown in Fig. 24;

Fig. 26 is a detached elevation, on a smaller scale than Fig. 24, of a saw-wear adjustment yoke shown in Fig. 24;

Fig. 27 is a sectional view on an enlarged scale taken substantially on broken line 27—27 of Fig. 24 showing a clevis member;

Fig. 36 is a wiring diagram showing the electrical controls and driving means for the machine.

Figure 1:
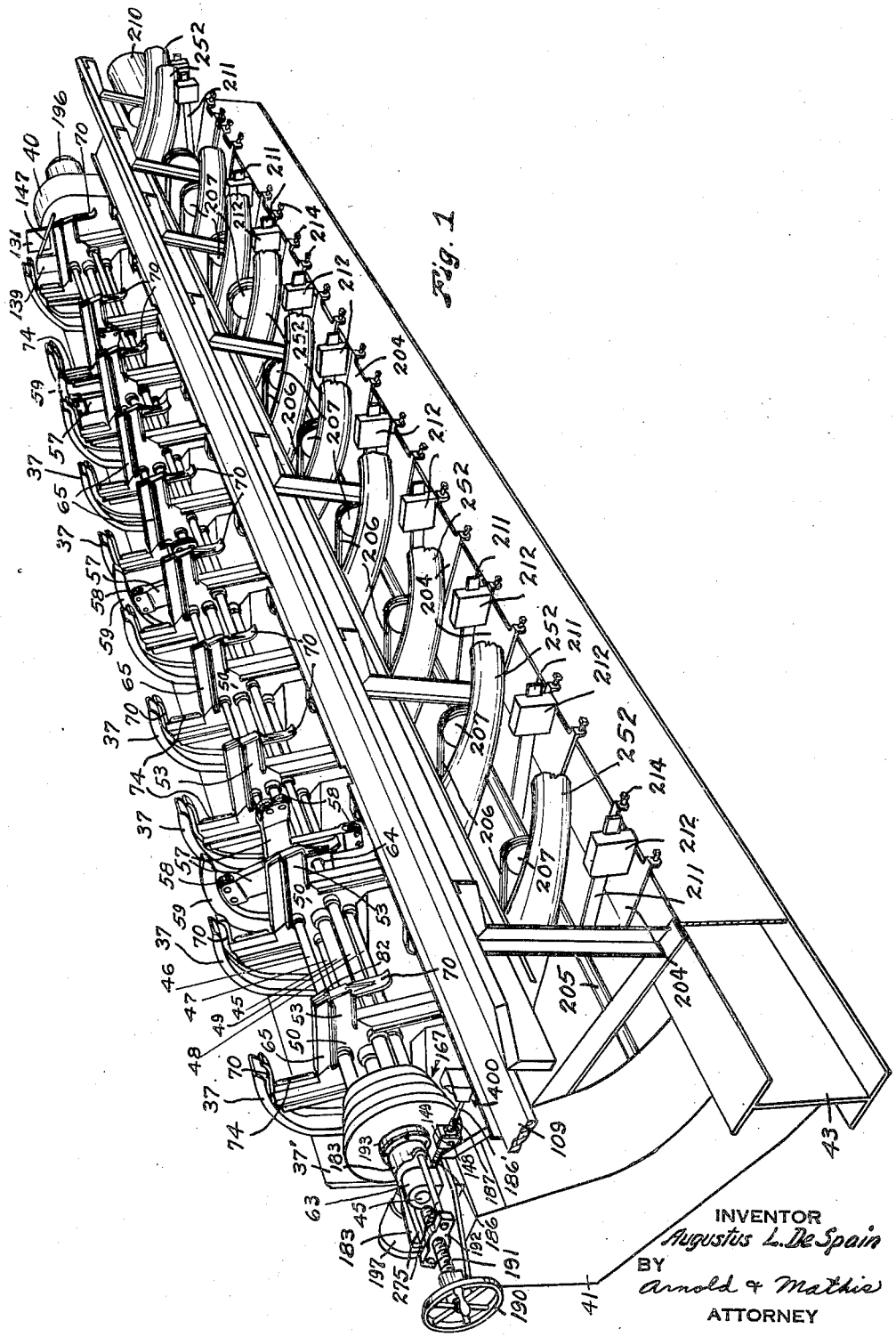
Figure 1 is a perspective view of an automatic bundle trimmer constructed in accordance with my invention, with parts of the lumber intake and discharge means omitted to better reveal other parts of the device.
Figure 28:
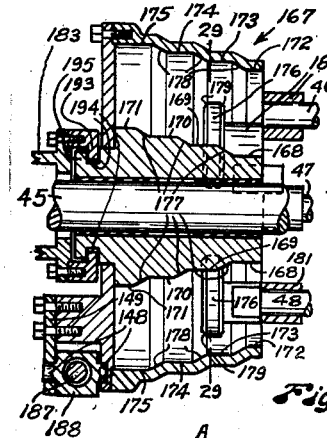
Fig. 28 is an axial sectional view of bundle-clamp cam drum means.

The frame of this machine comprises two end frame members 40 and 41, Figs. 1 and 2, a longitudinally extending side frame member 42, preferably in the form of a channel bar positioned at the left in Fig. 3, another longitudinally extending side frame member 43, preferably in the form of an I beam, positioned at the right in Fig. 3 and numerous smaller frame parts and brackets as hereinafter described.

Bundle carrying rotor means for receiving, clamping, holding and advancing the bundles of lumber 44 that are to be end trimmed and for properly positioning and rigidly supporting said bundles for the saws is provided in the form of a rotating unit comprising a longitudinally extending main shaft 45 and four clamp control shafts 46, 47, 48 and 49 positioned at equidistant intervals around said main shaft 45. The main shaft and clamp control shafts are rotatively advanced intermittently as a unit and the clamp control shafts are independently oscillated and are connected with bundle clamping means.

Preferably the bundle carrying rotor is advanced substantially one-fourth of one complete revolution at each forward excursion thereof. This provides four stations at which the bundles are stopped and these four stations are designated as stations A, B, C and D in the drawings. Station A, shown as the uppermost station in the drawings, is a loading station; station B is an intermediate station at which no work is done; station C is an end trimming station; and station D is a discharge station.

A plurality of clamp carrying brackets 50, Figs. 1 and 3, are secured at spaced apart intervals to the main shaft 45. Preferably each clamp carrying bracket 50 has a hub 51 secured to the main shaft 45 by a key 52, as shown in Fig. 3. Also, each clamp carrying bracket 50 is preferably provided with four outwardly protruding arms 53 to which clamping means of a form hereinafter described is secured.

The main shaft 45 is also provided at spaced apart intervals with fixedly secured bearing spiders 54, see Figs. 4 and 5. Each bearing spider 54 preferably has a hub 55 that is secured by a key 56 to the shaft 45. Each bearing spider 54 is also preferably provided with a plurality of outwardly protruding arms 57 having rollers 58 rotatively mounted in their outer end portions. It is satisfactory to provide four of the arms 57 on each bearing spider with two rollers 58 in each arm. The rollers 58 of the bearing spiders 54 are operatively disposed to roll within arcuate trackways 59, one trackway 59 being provided in connection with each bearing spider. Each trackway 59 is rigidly secured to the frame of the machine as by bracket members 60. Each trackway, see Fig. 4, is a circular segment of more than a half circle, preferably about two-thirds of a circle, in extent. This leaves an opening 61 in each trackway through which bundles 44 of lumber may be taken in and ejected.

The clamp control shafts 46, 47, 48 and 49 pass through suitable holes 64 in the bearing spiders 54.

Aside from the bearings hereinbefore described, the main shaft 45 is provided near its respective ends with bearings 62 and 63 as shown in Figs. 1, 2, and 19, the bearing 62 being shown in Fig. 19.

The bearings provided by the bearing spiders 54 with the rollers 58 rolling in the arcuate tracks 59 firmly support the bundle clamping assembly at spaced apart positions throughout its length and help to prevent undue vibration of this bundle clamping assembly which carries the load of the bundles 44 of lumber and must hold these bundles immovable while the saws are end trimming the same.

The end of the machine shown at the right in Figs. 1 and 2 is herein termed the head portion of the machine and the end of said machine therein shown at the left is herein termed the foot portion of the machine. The bundles after being trimmed, preferably are disposed of by being moved to the left, as respects the showing in said Figs. 1 and 2.

Fig. 1 shows a machine adapted for the end trimming of bundles of lumber ranging in length from four feet to twenty-one feet. Accordingly, I have positioned one bundle clamping device adjacent the head end of the machine, have spaced the next adjacent bundle clamping device about four feet from the first one and have spaced the remainder of said bundle clamping devices toward the foot of the machine at intervals of about two feet. Saws and bundle bumper or stop means hereinafter described are suitably positioned relative to the clamping means so that bundles of any length between four feet, plus at least enough to allow an end trim, and twenty-one feet, plus at least enough to allow an end trim, may be accurately trimmed to the nearest foot which the bundle allows. Thus bundles may be trimmed to lengths of either odd or even numbered feet. It will be noted that two saws are placed near the first bundle clamping device adjacent the head end of the machine and that two bundle stop members are provided adjacent these saws respectively.

Guard members 37 and guard plate 37' are provided at the side of the machine at which the operators stand for obvious purposes.

Each arm 53 of each clamp carrying bracket 50 has a rectangular housing 65 secured thereto as by cap screws 66, Figs. 3 and 9. Each housing 65 serves as a shelf or support on which a bundle 44 of boards may rest.

Each housing 65 is internally provided with two track members 67, Figs. 7, 8 and 9, adapted to be engaged by rollers 68 that are rotatively mounted between two spaced apart bracket members 69 of substantially L shape, see Figs. 6, 7, 8 and 9.

Preferably a brace member 82 is welded or otherwise rigidly secured to the outer end portion of the housing 65 to strengthen the same. Slots 83 in the housing 65 provide clearance for the L shaped bracket members 69.

A bundle-engaging member or clamp 70 is welded or otherwise rigidly secured between the outer end portions of each pair of L shaped brackets 69. Preferably each bundle-engaging member 70 has a padding 71 of soft material, such as rubber, on the face thereof that engages the bundle and preferably the outer end portion of each bundle engaging member 70 is inclined outwardly away from the surface of the bundle with which it engages.

Each bundle engaging member 70 and the bracket members 69 to which it is secured are connected by a pivot 72 with a fitting 73 that is rigid with one end portion of a tubular spring housing 74, see Fig. 7. Each spring housing 74 has a compression spring 75 therein. One end portion of each spring 75 engages with a nut member 76 that is positioned adjacent the fitting 73 and the other end portion thereof engages with a cap or insert 78 that is rigid with the housing 74. A shackle bolt 77 extends through the insert 78 and through the spring 75 and is threaded into or otherwise secured to the nut 76.

The portion of each bolt 77 external to the tubular housing 74 is connected, preferably by link members 79 and a pivot member 80 with a clamp control lever 81 that is rigidly secured to one of the clamp control shafts 46, 47, 48 or 49. Each spring housing 74 and the parts connected therewith and shown in Fig. 7, functions as a resilient link to connect one of the bundle engaging members 70 with one of the clamp control levers 81. This provides for a resilient pressure of each bundle engaging member 70 against the bundle clamped thereby.

Preferably the link members 79 and all similar link members used in this machine are standard steel roller chain parts with hardened bushings 39 and hardened pins 72, 80, etc., that extend through these bushings and are held in place by cotter pins 38. These standard roller chain parts are relatively small in size but are of ample strength, have excellent wear resistant qualities and are especially well adapted for the uses to which they are put in this machine. Preferably one link member 79 of each pair of links shown in Figs. 3 and 7 is welded to the adjacent fitting 78 and the other link of the pair is readily removable. This provides a structure that is very quickly and easily assembled and disassembled.

In addition to the bundle clamping devices hereinbefore described, means are also provided for clamping the sides of each bundle of lumber during the time the same is being trimmed. This involves the provision of a number of clamping devices which will move against the edges of the boards in a bundle after said bundle comes to rest in the position in which it is to be trimmed and which will be in an out of the way position while a bundle is being advanced to the trimming position.

This side clamping means, Fig. 10, comprises a number of side clamping members 83. Each side clamp member 83 has a face 84 of yieldable material adapted to engage with the edges of the boards in a bundle 44 and clamp said boards against the opposed face of one of the bracket arms 53. Each side clamp 83 is provided with an angular slot 85 that fits over a roller 86 carried by a bracket 87' that is rigid with the frame member 42. Each side clamp 83 is pivotally connected with a lever arm 87 that is rotatively supported on a side clamp rocker shaft 88. A power arm 89 is fixedly secured to the rocker shaft 88 adjacent each lever arm 87 and extends in a generally upward direction as shown in Fig. 10.

Preferably each power arm 89 is of the curved shape shown in Fig. 10 and preferably the lower end portion of each lever arm 87 is bifurcated and is rotatively mounted on the hub portion 89' of the power arm 89.

The upper end portion of each power arm 89 is connected with the adjacent lever arm 87 by resilient link means of the form shown in Fig. 11. Said resilient link means comprises a cylindrical housing 90 having preferably two compression springs 91 and 92 operatively disposed therein and separated by a guide piston 93. A rod or bolt 94 extends lengthwise in the housing 90 through the springs 91 and 92 and guide piston 93. One end portion of the rod 94 is connected with a nut 95. The other end portion of the rod 94 extends through a rigid end member 96 of housing 90 and is connected by pivot means 97 with the power arm 89. One end portion of the housing 90 is rigidly secured to an end member 98 that is connected by a pivot 99 with the lever arm 87.

From the above description it will be apparent that each link formed by the parts 90 to 99 inclusive provides a resilient connection between the upper end portion of a power arm 89 and the adjacent lever arm 87. This insures a firm but yieldable pressure against the edges of the boards in the bundle.

After a bundle 44 of lumber has been end trimmed at the lowermost station C the succeeding ninety degree movement of the bundle carrying means will advance said bundle to station D shown at the right in Fig. 3, after which said bundle will be dropped onto suitable bundle supporting means or drop arms, see Fig. 12.

Said bundle supporting means comprises a plurality of drop arms 100 each supported on one or more pivot shafts 101 positioned at the lower end portions of said arms 100. Each arm 100 extends upwardly and is inclined to the left as respects the showing in Figs. 3 and 12. A bundle supporting plate 102 having a deflector portion 103 is secured to the upper end portion of each drop arm 100. A bundle receiving face 104 of soft material, such as rubber, is provided on the plate 102.

A stop link 105 is pivotally connected with the drop arm 100 and is slidable through a guide member 106. A compression spring 107 is operatively disposed on the link 105 so as to engage with the guide member 106 and act as a cushion when the drop arm 100 moves by gravity from the position shown by dot and dash lines to the position shown by full lines in Fig. 12.

In the event that there is a bundle of lumber resting on the bundle supporting drop arms 100, 102, 104 at the time the rotary bundle carrying means begins to move in a counterclockwise direction as respects the showing in Figs. 3 and 12, then the housing members 65, adjacent the bundle of lumber that rests on said drop arm, will engage said bundle and move the same to the right and onto an endless moving conveyor belt 108 that is operable in trough shaped guide means 109. The guide means 109 is supported on transverse frame members 110. At the time the bundle carrying means begins to move counterclockwise as respects the showing in Figs. 3 and 12, the bundle of lumber which has just been end trimmed at the lowermost station C will begin to move toward the drop arms 100, and if said drop arms are not moved to the right, Fig. 12, by a bundle that rests thereon then the last trimmed bundle will engage with the deflector members 103 and move said deflector members and the drop arms 100 that are connected therewith sidewise out of the way of said bundle. After the just trimmed bundle in the bundle carrying means has passed above and clear of the deflector member 103 and drop arm supporting members 102, and after the preceding bundle that was resting on the said drop arm supporting members 102 has been discharged onto the conveyor belt 108, then the drop arm parts 102, 103 and 104 will be moved by gravity back into the position shown by full lines in Fig. 12. After a forward excursion of the bundle carrier means the bundle at D station thereof will be held by the top clamps 70 until released by the operators as hereinafter described whereupon it will drop onto the drop arms, where it will remain until it is moved sidewise onto the discharge conveyor belt 108 by the next forward excursion of the bundle carrying means.

Each set of drop arms 100 is connected by a link 111 with an electric switch 394 for purposes hereinafter explained in connection with the wiring diagram Fig. 36.

It has been found desirable to use two of the pivot shafts 101 for supporting the drop arms 100, said shafts being positioned in end to end alignment and each shaft supporting the drop arms 100 for its end portion of the machine. Three drop arms 100 on one shaft 101 positioned to serve the head portion of the machine and three drop arms 100 on another shaft 101 positioned to serve the foot portion of the machine have been found satisfactory. Preferably the drop arms 100 are keyed to their shafts 101. The use of two drop arm shafts 101 obviates moving drop arms throughout the entire length of the machine when short bundles are being end trimmed. One safety switch 394 is provided in connection with each set of drop arms. Obviously this structure may be varied by the use of one or more drop arm shafts or each drop arm can be mounted on a separate pivot and a corresponding number of safety switches 394 provided.

The bundles 44 of lumber are preferably brought to this machine on endless traveling conveyors 113 that are mounted on pulleys 116 supported on frame members 114 positioned on the right hand side of the machine as respects the showing in Fig. 3. The driving mechanism for the conveyors 113 is preferably electrically controlled. A switch operating member 115, Fig. 3, is positioned in the path of the incoming bundles 44 of lumber near the discharge end of the conveyors 113. When an incoming bundle 44 of lumber engages the switch operating member 115 it operates a switch 117 and stops the conveyor and the said bundle 44 remains on the end portion of the conveyor until it is grasped by the operators and moved into the bundle clamping and holding means. This releases the switch operating member 115 which moves switch 117 to again start the conveyors 113. Thus as soon as one bundle 44 is removed from the conveyors 113 the succeeding bundle is automatically advanced to the discharge end of the conveyors and the conveyors are stopped.

The machine operators stand at the side of the machine opposite to the conveyors, i. e., the left hand side of the machine as respects the showing in Fig. 3. From this position they grasp a bundle 44, draw said bundle into the bundle clamping and moving units at station A, move said bundle endwise against a hereinafter described stop and circuit control means at the head end of the machine, tie said bundle and close the circuits which start a bundle-moving and end-trimming cycle.

The bundle stop and circuit control means at the head end portion of the machine comprises a housing 120, Figs. 13, 14, 15, 16 and 17, secured to the side frame member 43. Two bar members 121 are supported for limited longitudinal movement within the housing 120. The bar members 121 have rollers 122 journaled therebetween that roll on track members 123 in the housing 120. The bar members 121 have upwardly protruding lugs 124 and 125 at opposite ends thereof that extend through slots 126 in the housing 120 and protrude above said housing 120. Longitudinal movement of the bar members 121 is limited in both directions by engagement of one or both of the lug members 124, 125 with the ends of the slots 126. A compression spring 127 in a tubular housing 128 is operatively connected between the lugs 124 and lug means 129 on the housing and yieldingly urges the bar members 121 to the limit of their movement to the left as respects the showing in Figs. 13, 14 and 15. The compression spring assembly 127—128 is similar to the compression spring assembly shown in Fig. 7 and hereinbefore described.

One stop member comprises a generally horizontal bottom plate 130, an upright stop plate 131, a web portion 132, and side lugs 133. A pin 134 connects the plate 130 with the lugs 125 at the left hand end of the device as respects the showing in Figs. 13, 14 and 15.

The side lugs 133 have stud pins 135 and 136 projecting outwardly therefrom to serve as fulcrums for two sets of parallel bars 137 and 138 respectively. A stop plate 139 is connected by pins 140 with the left hand end portions of said parallel bars 137 and 138, reference being made to Figs. 13, 14 and 15. The right hand end portions of the bars 137 shown in Figs. 13, 14 and 15 are connected by pivot bolts 141 with a counterweight 142. The upper end portion of the counterweight 142 is preferably pivotally connected by link means 143 with the upper portion of the web 132. When the bars 137 and 138 and stop member 139 are released and left free the counterweight 142 will hold them in the elevated position shown in Fig. 14 and a stop lug 145 will limit their upward movement. If it is desired, to trim a bundle to a length measured in an odd number of feet then the stop member 139 and bars 137 and 138 may be depressed into the position shown in Fig. 15 so that they will be clear of the bundle, which may then engage stop member 131. Preferably an inclined arm 147, Figs. 1 and 13, is provided on the stop plate 139 flush with the top edge of said stop plate and in a position to be engaged and depressed by the end portion of a bundle of lumber in the event the end portion of the bundle projects beyond or to the right, Figs. 13, 14 and 15, of the stop member 139. Thus odd length bundles 44 that are to be stopped against the stop member 131 may be positioned so that they will engage with the arm 147 and depress the stop member 139 out of the path of the bundle of lumber and ride up over said stop member 139 as said bundles of lumber are drawn toward the bundle clamping means.

After a bundle 44 is positioned in the bundle clamping means at station A said bundle is moved, by the operators, endwise against one of the stop members 131 or 139. The end of the bundle is thus caused to bump against one of these stop members. This tends to even up the boards in the bundle or to position their ends all flush with each other. This bumping of the bundle against one of the stop members 139 or 131 also moves all parts of the stop assembly, except housing 120, to the right with reference to Figs. 13, 14 and 15 as far as the slots 126 will permit and operates an electric switch 387 hereinafter described, that is connected with the stop assembly by a switch operating rod 144.

The bundle holder assembly comprising the main shaft 45, clamp control shafts 46 to 49 inclusive, and parts associated therewith are intermittently advanced through angular distances of ninety degrees by suitable means, as the driven Geneva motion means of the form shown in Figs. 18 and 19. It is to be noted that Fig. 18 views the machine in the opposite direction from Figs. 3, 4, 10 and 12.

This Geneva motion means comprises a Geneva plate 150 positioned in a housing 151 in the end frame member 40 and secured to the main shaft 45 which passes through a bearing 62 and into said housing 151. The Geneva plate 150 has four slots 152 disposed at ninety degree intervals and said plate 150 is provided with concave surfaces 153 between the slots 152. The concave surfaces 153 are adapted for engagement with convex surfaces 154 on a driver member 155. The driver member 155 has concave peripheral recesses 156 which provide clearance to allow the Geneva plate 150 to turn and said driver member 155 has fixedly mounted bracket plates 157 which carry rollers 158 that operate in the slots 152. Three rollers 158 are shown on the driver 155 but obviously the number of rollers may be varied. When the convex surfaces 154 of the driver 155 are in engagement with the concave surfaces 153 of the Geneva plate 150 the Geneva plate will be held fixed and non-rotatable. When the driver 155 rotates the rollers 158 will operate in the slots 152 and at each such operation, a quarter turn will be imparted to the Geneva plate 150 and to the bundle carrying assembly that is connected therewith. The recesses 156 in the driver plate 155 provide clearance for the outwardly protruding portions of the Geneva plate 150 as said plates 155 and 150 rotate.

The driver member 155 is secured to a shaft 160 that is journaled in bearings 161 in the housing 151 and extends outwardly from said housing 151 to certain electrical control means including commutator-switch devices 351, 362, 363, 364 and 365 of a form more fully hereinafter described in connection with Figs. 35 and 36.

A gearwheel 166 is secured to the shaft 160, preferably within the housing 151. The gearwheel 166 meshes with a pinion 163 on a shaft 164 driven from a bundle rotor motor 196. The control means for bundle rotor motor 196 are hereinafter explained in connection with the wiring diagram, Fig. 36. When the driver plate 155 is driven by motor 196 intermittent ninety degree movements will be imparted to the bundle carrying means through Geneva plate 150.

The control means for oscillating the clamp control shafts 46, 47, 48 and 49 comprises an oscillating cam drum, Figs. 28, 29, 30 and 31, designated generally by numeral 167 and rotatively mounted on the main rotor shaft 45 near the foot of the machine. This cam drum 167 is also longitudinally movable on shaft 145 as hereinafter explained to adjust for bundles of lumber of different thicknesses.

The cam drum 167 comprises a smaller inner drum made up of a plurality of cam tracks 168, 169, 170 and 171 of progressively increasing diameters and a larger outer drum made up of a plurality of cam tracks 172, 173, 174, and 175 of progressively increasing diameters. The cam tracks of the smaller and larger cam drums are paired so as to receive therebetween cam rollers 176 that are connected with the four shafts 46, 47, 48 and 49 by crank members 181.

Inclined surfaces 177 are provided between adjacent cam surfaces 168 to 171 inclusive, and correspondingly inclined surfaces 178 are provided between adjacent cam surfaces 172 to 175 inclusive. The inclined surfaces 177 and 178 cooperate with beveled edge portions 179 on the cam rollers 176 to help shift said cam rollers from one set of cams to another when the cam drum assembly is moved longitudinally as hereinafter explained.

The operation of the cam rollers 176 between the pairs of cam surfaces is similar to the operation of an ordinary cam roller in a cam groove.

The four pairs of cam surfaces of different diameters provide four different adjustments for clamping bundles of lumber of different thicknesses. For instance the number of boards in a bundle may be varied and the cam drum assembly may be longitudinally moved to compensate for this variation so as to properly engage the top clamps 70 with a bundle of any desired thickness within certain desired limits. The thickness of the individual boards in a bundle may also vary.

The rollers 176 are rotatively mounted on bearing pins 180 that are carried by crank members 181. The crank members 181 are keyed or otherwise non-rotatively secured to the clamp control shafts 46, 47, 48 and 49.

Figure 29:
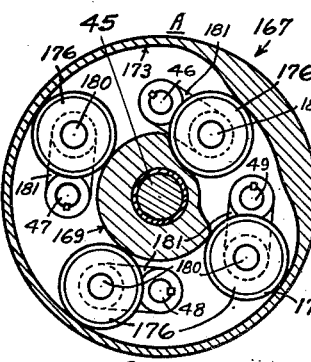
Fig. 29 is a sectional view of said cam drum taken substantially on broken line 29—29 of Fig. 28.
Figure 30:
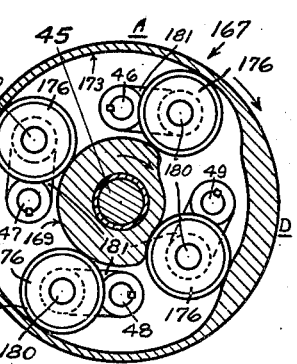
Fig. 30 is a view similar to Fig. 29 showing the cam drum and some of the cam rollers in different positions from that shown in Fig. 29.
Figure 31:
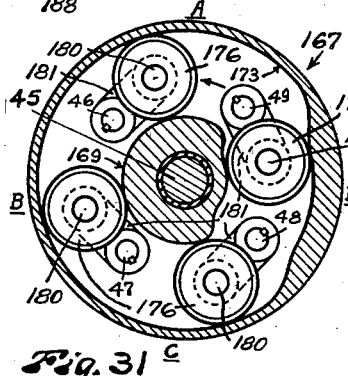
Fig. 31 is another view similar to Figs. 29 and 30 showing still another operative position of the cam rollers.

The cam surfaces 168 to 175 are shaped as shown in Figs. 29, 30 and 31 when viewed in cross section or from the end of the cam drum 167. Only the cam surfaces 169 and 173 are shown in Figs. 29, 30 and 31, it being understood that the other cam surfaces are similar in shape to the surfaces 169 and 173 but vary in size.

Each cam track has a cylindrical portion of sufficient extent so that three of the cam rollers 176, which are spaced approximately ninety degrees apart, will always be in engagement therewith and each cam surface has a flattened portion on one side thereof with which the fourth cam roller will cooperate. This provides for always holding three of the top clamps 70 in engaged or clamped position and the fourth top clamp released or disengaged. A cam drive motor 197 is provided for the purpose of rotatively moving the cam drum to clamp and unclamp the bundles 44.

Figure 32:
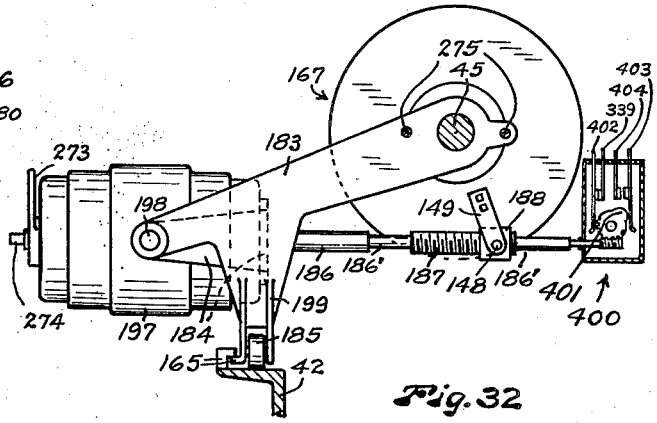
Fig. 32 is a detached side elevation with parts in section, taken substantially on broken line 32—32 of Fig. 2, and showing a motor for operating the cam drum that is shown in Figs. 28 to 31.

The cam drive motor 197 that is provided for rotatively adjusting the cam drum 167, see Figs. 2 and 32, preferably has the inner end portion thereof secured to a U shaped bracket 184. Another bracket 183 is connected by horizontal pivot means 198 with the bracket 184. This leaves the bracket 184 and motor 197 free to tilt on the horizontal pivot means 198. The inner end portion of bracket member 183, i. e., the end portion shown at the right in Fig. 32, is pivotally supported on the main shaft 45 of the bundle carrier. Preferably a roller 185 operable in a downwardly extending arm 199 of bracket 183 is movably supported on side frame member 42. Preferably hold-down means 165 is provided in connection with the roller 185 so as to allow motor 197 to be moved along the frame member 42 and at the same time prevent upward movement of said motor 197. Motor 197 has a shaft 186 provided with a worm or screw threaded portion 187 that is threaded through a nut 188. The nut 188 is pivotally connected by pivot means 148 and bracket means 149 with the end portion of cam drum 167 adjacent the periphery of said cam drum 167.

Preferably the motor shaft 186 has a portion 186' of reduced diameter at each end of the threaded portion 187, onto which portions 186' the nut 188 may run and cease movement in the event of over-travel of the motor. These portions 186' constitute a safety feature.

With the structure just previously described it will be obvious that rotation of the motor 197 in one direction will angularly move the cam drum 167 in one direction and rotation of the motor in the opposite direction will move the cam drum 167 in an opposite direction. It has been found that an angular movement of the cam drum 167 through an angle of thirty-nine degrees is satisfactory for the machine herein disclosed, but obviously this degree of angular movement may be varied.

The end portion of the motor shaft 186 preferably extends into the housing of a limit switch 400 and is provided with switch operating means 401 for controlling circuits to the motor 197. The switch means in housing 400 provides limit switches for limiting rotation of the motor 197 in two different directions. The circuits controlled by these limit switches are formed in part by conductors 399 and 402 and conductors 403 and 404. The operation of these circuits is fully explained in connection with the wiring diagram, Fig. 36.

In the operation of the top clamp cam means by motor 197, when the bundle carrier first comes to rest at station A after being advanced substantially ninety degrees, the top clamp 70 at station A will be in released position and the top clamps at all of the other stations, B, C, and D, will be closed. At this time the cam drum 167 and cam rollers 176 will be in the relative positions shown in Fig. 29 with the roller 176 that is connected with shaft 46 on the flattened portion of the cam surface 169 and the other three rollers 176 on the cylindrical portion of said cam surface 169. After the operators have moved a bundle of lumber onto the bundle carrier at station A they will move said bundle endwise and bump the end of the same against either the bumper plate 139 or the bumper plate 131. This will operate the switch 387 and start the top clamp motor 197 which will rotatively move the cam drum 167 in a clockwise direction as respects the showing in Figs. 29 and 30 from the position shown in Fig. 29 to the position shown in Fig. 30. This movement of the cam drum 167 will cause the roller 176 at loading station A, which roller is connected with shaft 46, to be moved outwardly onto the cylindrical portion of the cam track 169, thus clamping the bundle at station A. At the same time it will cause the roller 176 at unloading station D, and that is connected with the shaft 49, to move inwardly onto the flattened portion of the cam track 169 thus unclamping and dropping the bundle in station D.

After the above described clamping and unclamping operation has taken place and after the bundle at station A has been properly tied, the operators will press downwardly on their respective switch control pedals 329 and 330. The depressing of the last pedal 329 (Fig. 3) of 330 will complete the circuit to the bundle rotor control motor 196, provided the saws 200 and side clamp 83 are in starting position, and the bundle rotor will start to move in a counterclockwise direction as respects the showing in Figs. 30 and 31. When the bundle rotor thus starts to move counterclockwise the cam 167 and rollers 176 will be in the relative positions shown in Fig. 30. As the bundle rotor, of which the shafts 46, 47, 48 and 49 are a part, moves counterclockwise from the Fig. 30 position, the cam drum 167 will remain stationary for a predetermined period of time and the rollers 176 will roll on the cam surfaces but will not be moved radially of the cam. When the rollers 176, in their counterclockwise movement, have reached approximately the position shown in Fig. 31, then the cam control motor 197 will be energized, as hereinafter explained in connection with the wiring diagram, Fig. 36, and the cam drum will be moved counterclockwise along with the bundle rotor until both are stopped at the end of approximately ninety degrees of movement of the bundle rotor. This will bring the cam 167 back to the position shown in Fig. 29 and the rollers 176 will occupy positions similar to those shown in Fig. 29 except that each roller will have advanced one-fourth of one revolution.

From the above description it will be seen that the bundle rotor always moves by intermittent steps of substantially ninety degrees in the same direction, i. e., counterclockwise as respects the showing in Figs. 3, 29, 30, and 31, while the cam drum 167 oscillates back and forth through an angle sufficient to operate the bundle clamps. Said cam rotor operates the bundle clamps when it moves in one direction and then moves idly in the reverse direction back to its starting position. The limit switch means 400, shown in Figs. 32 and 36, stops the cam drum motor at both ends of its cycle of operation.

In accordance with the mode of operation just described, the bundle clamps 70 are continuously held in clamped position while they are moving from station A to station D, are unclamped at station D to drop their bundle and remain unclamped while moving from station D to station A and until the operators, in loading in a new bundle, bump the same against one of the stops 139 or 131.

Preferably the outer end portion of top clamp motor 197 has a hand lever 273 provided thereon for operating a magnetic brake of well known construction that is a part of the motor. Also, preferably the outer end portion of the shaft 186 of said motor is flattened, as shown in Fig. 32, to provide a tang 274 to which a removable crank may be applied to manually turn the motor for timing the machine. The bundle rotor motor 196 (Fig. 19) and saw cam motor 182 (Fig. 20) are preferably each provided with a similar magnetic brake control lever and a similar tang.

The top clamp motor 197 together with cam drum 167 are adapted to be moved longitudinally of the machine by a handwheel 190, see Figs. 1 and 2, secured to a screw 191 that is threaded through a longitudinally movable yoke 192. The yoke is connected by rods 275 with the frame member 183.

Split collar means 193 is connected with the frame member 183 and engages within a groove 194 in a hub member 195 (Fig. 28) on the cam drum 167 to selectively adjust said cam drum longitudinally of the machine when the handwheel 190 is turned. By such adjustment the cam drum 167 can be shifted so that the rollers 176 will cooperate with any desired set of cam surfaces thereof depending on the thickness of the bundles being clamped. The cam drum 167 is thus selectively adjustable manually for bundles of different thicknesses and is rotatively movable automatically for clamping and unclamping the top clamps 70.

A plurality of trimmer saws 200, Figs. 2, 3, and 22 to 27 inclusive, are mounted by means of bearings 201 and saw arbors 209 in saw swing arms 202. The two saws 200 adjacent the head end of the machine are preferably positioned at a distance of one foot apart. The third saw 200 is preferably spaced four feet from the second saw and the remaining saws between the third saw and the foot of the machine are preferably spaced at two foot intervals. Such spacing permits the sawing of bundles to present recognized standard lengths as measured in either an even or an odd number of feet.

The saw swing arms 202 are mounted for swinging movement on pivots 203 that are supported from brackets 204. The brackets 204, Figs. 3, 22 and 23, are secured to the frame member 43 and are preferably adjustable by set screws 214. A saw driving shaft 205 is mounted a short distance back of the pivots 203 and each saw 200 is connected by one or more endless belts 206 with the saw driving shaft 205. The belts 206 operate on pulleys 207 on the shaft 205 and other pulleys 208 that are connected with the arbors 209 of the saws. The shaft 205, pivots 203, and saw arbors 209 are approximately in line and the saw swing arms do not operate through a very great angle. For this reason the belts 206 will always function efficiently even though there is a slight change in the tension of said belts 206 during the swinging of the saws. In the structure shown the change in distance between centers 209 and 205 during the sawing operation will tend to tighten the belts 206. A motor 210, Fig. 2, is connected with the saw driving shaft 205.

Each saw swing arm 202 has a lever arm 211 connected therewith, Fig. 3, and an adjustable counterweight 212 is provided on each lever arm 211 to counterbalance the weight of the saw and insure smoother and easier stroking operation of the saw.

Each saw swing arm 202 has a rigidly connected downwardly extending arm 213, see Figs. 3 and 22. Preferably the lower end portion of each arm 213 has an adjustable set screw 215 therein for engagement with a lug 230 on a U shaped saw actuating arm 216, Figs. 3, 22, 24 and 26.

The saw actuating arm 216 is further connected with the downwardly extending arm 213 by a lug 217 on the arm 216 that has a slot 218 which fits over a stud screw 219 in the arm 213, permitting adjustment.

The lower end portion of each saw actuating arm 216 has a roller 220 journaled therein, see Figs. 24, and 27, that is positioned for engagement by the head portion 221 of a cap screw 222. The cap screw 222 is adjustably secured in a clevis member 223, that is connected by pivot means 224 with the bifurcated upper end portion of a saw operating rocker arm 225, Figs. 22, 24, 25 and 27. The lower end portion of each arm 225 is rigidly connected with a saw rocker shaft 226.

Pivot means 276 connects the clevis 223 with link means 228'. Link means 228' is operated by a solenoid 462' and functions, when said solenoid is energized, to move a clevis 223 so that the head 221 of screw 222 will engage with the roller 220 and stroke a saw 200 when the saw shaft 226 is oscillated. If the solenoid 462' is not energized the clevis member 223 and screw 222 with head 221 will drop down by gravity into the position shown by dot and dash lines in Fig. 24 and will be clear of the roller 220 and saw actuating arm 216 when the lever arm 225 is angularly moved to the left from the position shown in Figs. 3, 22 and 24. The clevis member 223 is pivotally connected with the bifurcated upper end portion of the saw operating rocker arm 225 as best shown in Fig. 27, and the lower end portion of the saw actuating arm 216 is narrow enough to pass between the two side portions of arm 225 when the clevis member 223 is lowered into the dot and dash line position shown in Fig. 24.

It will be understood that independent control means is provided for each saw and that in normal operation of this machine only the solenoids 462—462' etc., associated with the saws that are to be stroked will be energized at the time the saw stroking shaft is oscillated. The saws that are to be stroked are automatically selected by each individual bundle and are the saws which are properly positioned to trim the ends of the bundle, depending on the length of the bundle. The saw selected for the head of the bundle depends on whether the bundle is to be trimmed to an odd or even length, i. e., whether said bundle is positioned against the bundle bumper stop 131 or the stop 139. The saw selected to trim the foot of the bundle will be the saw that will trim said bundle to the maximum possible commercial length for which it has been rough trimmed.

A plurality of bundle operated switch control triggers 146, Figs. 2 and 3, are supported on the machine adjacent the respective saws and preferably substantially in the positions shown in Fig. 2, and cooperate with the bundles in selecting the saws to be stroked. The circuits controlled by the bundle operated triggers 146 and by which the solenoids 462, 462', etc., are energized are diagrammatically shown in Fig. 36 and are described in connection with said Fig. 36.

The saw rock shaft 226 extends into a housing 240 at the head end of the machine, see Figs. 18, 20 and 21, and is provided with a saw rocker arm 241. A roller 242 on the rocker arm 241 engages with a saw stroking cam 243 on a driven shaft 244. The motor 182 is connected with the shaft 244 through pinion 245 and gearwheel 249 for driving the same. The cam 243 is adapted to impart movement to the shaft 226 to stroke the saws and trim the bundles. The weight of the saws, acted on by gravity, will retract the saws and will hold the roller 242 always in engagement with the cam 243. Also, an additional outer cam track may be employed to positively retract the saws if desired.

The side clamp rocker shaft 88 also extends into the housing 240, see Fig. 18, and has a side clamp rocker arm 246 secured thereto. The arm 246 has a roller 247 mounted on the upper end thereof and positioned in engagement with a side clamp operating cam 248 on the shaft 244. The cam 248 is suitably shaped to hold the side clamps in engagement with the bundles while the saws are being stroked to trim the bundles and retracted out of the way.

Figure 33:
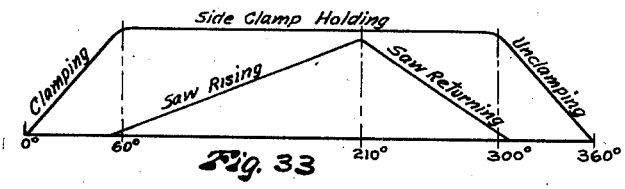
Fig. 33 is a cam diagram illustrating the operation of the side clamp means and saw stroking means.

The operation of the side clamp cam 248 and saw stroking cam 243 is diagrammatically shown in the cam diagram Fig. 33. Each time a complete revolution is imparted to the shaft 244 a complete cycle of movement will be imparted to the side clamp shaft 88 and saw stroking shaft 226. This will be apparent from an inspection of the shape of the cams 248 and 243 shown in Fig. 18.

Referring to Figs. 18 and 33, the cams 248 and 243 and levers 246 and 241 are shown in full stroke position in Fig. 18. These parts are adapted to go through a cycle of operation each time the bundle rotor is stopped after being advanced ninety degrees.

Assuming that the bundle rotor has come to rest at the point marked 0° in Fig. 33, then at this instant the side clamps 83 will start their clamping movement. By the time the shaft 244, Fig. 18, has rotated 60°, as indicated by the degree graduations at the bottom of Fig. 33, the side clamps 83 will have been applied and the stroking of the saws 200 will just have been started. While the shaft 244 is rotating from just in advance of 60° to 210° the saws 200 will be stroked through the end portions of the bundle. During angular movement of the shaft 244 between the 210° position of shaft 244 and just beyond the 300° position of said shaft 244 the saws 200 will be retracted to starting position. The side clamps 83 are held clamped between the 60° position and the 300° position of shaft 244 and are retracted between the 300° and the 360° positions of said shaft. This completes a cycle of operation of the side clamps and saws.

While the above described cycle of operation of the side clamps and saws is taking place the top clamps 70 at stations B and C are holding, the operators will usually be taking in a new bundle at station A, then operating the top clamps 70 to clamp the new bundle at said station A and to release a previously trimmed bundle at station D, and then tieing the new bundle at station A while the bundle at station C is being end trimmed. After the tieing of the bundle is completed the operators will press downwardly on their respective switch pedals 331 and 332, Fig. 2. If the saws 200 and side clamps 83 have re-returned to their starting position before these pedals 331 and 332 have both been depressed then the depressing of the last pedal 331 or 332 will start the bundle rotor. If the saws 200 and side clamps 83 have not completed their stroke then the circuits for starting the bundle rotor cannot be completed until both the saws and side clamps have returned to their starting position. The operation of the circuits governing the starting of the bundle is fully explained in connection with the wiring diagram, Fig. 36.

Each saw 200 is positioned within a generally circular saw shield or housing 250, Figs. 3, 22 and 23, that is rotatively supported on the saw swing arm 202 of its respective saw and that has a notch 251 in its upper portion of suitable shape, size and position to clear the bundle as the saw is stroked relative to the bundle. Each saw housing 250 has a link 254 secured thereto by pivot means 255. Each link 254 has one end portion connected by a pivot 256 with the frame member 43. The link 254 functions to adjust the angular position of the saw shield 250 so that the notch 251 will always register properly with the bundle when the saw is stroked, see dot and dash line position of the notch 251 in Fig. 22. This permits the use of a notch 251 of minimum size in the saw shield 250.

Suction means for withdrawing the sawdust from the saws is provided in the form of suction conduits 252, Fig. 3, having open mouth portions 253 positioned adjacent the saws to receive the sawdust and having their outer portions connected with a manifold suction conduit 257 by which the sawdust is taken off to a point of disposal. Frame bracket means 258 may support the conduits 252. Preferably the peripheral wall of the shield 250 is cut away at the location of the mouth 253.

A foot control means for use by the operators of the machine is shown in Figs. 2 and 3. This foot control means comprises two foot pedals 331 and 332, one for each operator, see Fig. 2. Preferably these foot control pedals are positioned substantially flush with the floor 231, on which the operators stand, and can be easily depressed with the toe or ball of the foot. The foot control pedals 331 and 332 are respectively connected with switches 329 and 330 as shown in the wiring diagram, Fig. 36. One foot pedal 331 and one switch 329 are shown in Fig. 3, and it will be understood that the other foot pedal 332 and switch 330 are of substantially duplicate construction. An operating rod 232 connects the foot pedal 331, Fig. 3, with its switch 329, and the other foot pedal 332 is similarly connected with its switch. The pedals 331 and 332 cooperate in the control of the starting of the bundle rotor as more fully hereinafter explained in connection with the wiring diagram, Fig. 36.

Another foot control is provided in close proximity to the pedals 331 and 332 and preferably just above these pedals so that it may be conveniently operated by the toe. This other foot control is in the form of a pedal 233, such as a rod, extending throughout the major portion of the length of the machine and common to both operators. This pedal 233 is fulcrumed on pivot means 234 and has two arms 235 and 236 extending in opposite directions from the pivot means 234 that are respectively connected by rods 237 and 238 with an unclamp switch 395 and an emergency stop switch 507. Movement of pedal 233 in one direction will unclamp the top clamps 70 at station A, and movement of said pedal 233 in the opposite direction will stop the machine in an emergency. Balanced spring means is provided in housing 260 to always bring the switch pedal 233 back to its starting and neutral position when said pedal 233 is released. This spring means preferably comprises the housing 260, two compression springs 261 and 262 in said housing separated by a partition plate 263, an operating rod 264 extending through the housing and having its upper end portion secured to an arm 265 of the pedal member 233, two fixed end members 266 and 267 for the housing 260 and two sleeves 268 and 269 extending through the end members 266 and 267 respectively and having head portions 270 thereon positioned within the housing 260 in engagement with the outer ends of the springs 261 and 262. The lower end portion of sleeve 268 is engaged by a nut 271 on the rod 264 and the upper end portion of the sleeve 269 is similarly engaged by a head 272 on the rod 264.

The springs 261 and 262 will always bring the pedal member 233 back to the same starting position with the heads 270 of both sleeves 268 and 269 resting against the ends 266 and 267 of the housing 260 and said springs will yieldingly resist movement of said pedal member 233 in either direction.

In the previous description, most of the mechanical parts of this invention have been described. In view of the fact that many of the mechanical parts are electrically interconnected, as will appear, they will be correlated and the mode of operation of the mechanism is described in connection with the wiring diagram Fig. 36.

300 designates any suitable source of electrical energy. As 440 volts three phase energy is readily available at most lumber plants, this wiring diagram has been designed for such type of electrical energy, but it is to be expressly understood that the same forms no limitation and is merely illustrative. Preferably a magnetic operated remote control switch 301 is employed as a master switch to energize or de-energize all motors and all electrical controls. The master switch 301 is a normally open switch and is magnetically closed by energizing solenoid means 302. All three switch blades of master switch 301 open and close together. Tracing the circuit for closing master switch 301, energy on conductor 304 passes through the coil of solenoid means 302, thence along conductor 305, and through manually operable switch 303 (said switch 303 is manually closed at all times when operation is desired and manually opened at all desired inoperative periods). The energy leaving switch 303 passes along conductor 306, thence through normally opened start switch 307, thence along conductor 308 and to a conductor 309 connected with source of energy 300. Thus upon closing manual switch 303 and momentarily closing start switch 307, coil of solenoid means 302 is energized by energy flowing between conductors 304 and 309. After momentary contact in switch 307 closing switch 301, the energy along conductors 304, 305, and 306 flows through normally closed manually operable stop switch 310, thence along conductor 311, and through thence closed stop switch 507 and closed master switch 301 to conductor 309. Thus master switch 301 is closed by momentary contact in switch 307 and is held closed until opening of switch 310 or switch 507.

After closing of master switch 301, energy from conductors 304, 312, and 309 will pass through said master switch 301 to conductors 313, 314 and 315 respectively. Energy on conductors 313, 314, and 315 will pass to conductors 316, 317 and 318 and through switch 319 to energize saw motor number 210. The saw motor 210 is shown diagrammatically in Fig. 36, and is shown also in Fig. 2, and drives the saws 200 through belt means 206 shown in Fig. 22. A normally open magnetically closed and remote controlled switch 319 serves to connect and disconnect the saw motor 210 from conductors 316, 317 and 318. The control circuit for the saw motor 210 comprises a solenoid means 320 connected with conductor 318, thence to conductor 321, thence through manually operable switch 322, and thence to conductor 323 which is connected with conductor 316. Thus when manually operable switch 322 is closed (and the same is closed during normal operation), the coil of solenoid means 320 is energized between conductors 318 and 316. As conductors 316, 317 and 318 are connected to the output of master switch 301, the saw motor switch 319 and the saw motor 210 can only be energized when master switch 301 is in closed position.

The load or output side of master switch 301 is also connected to conductors 324, 325 and 326. Said conductors 324, 325 and 326 are connected to a normally open magnetically closed remote controlled switch 327 which operatively connects bundle rotor motor 196 with conductors 324, 325 and 326. This bundle rotor motor 196 is shown in Fig. 2 and drives the bundle holder assembly shown in Figs. 2, 3 and 10.

The control circuit, for energizing the coil of solenoid means 328 and in turn closing switch 327, is controlled by two switch members 329 and 330. These switches 329 and 330 are normally open switches and are positioned so that one operator may close switch 329 and another operator may close switch 330. Said switches 329 and 330 are operatively connected with foot pedals 331 and 332 (shown in Figs. 1 and 3). The purpose of said switches 329 and 330 is to place the control of the bundle rotor motor 196 and in turn the rotation of the bundle rotor mechanism under the joint control of two operators. In other words, when the bundle rotor mechanism is at rest and the operators are placing tie members around a bundle located in station A, it requires the action of both operators to start the rotation of the bundle rotor mechanism. If the operators, after making a tie around said bundle in station A, desire that the bundle holder rotary mechanism shall start rotation for a 90° movement, then after each operator has placed his tie about the bundle, the operators will respectively close switches 329 and 330. No operation of the bundle motor 196 is possible until after both switches 329 and 330 have been closed.

Tracing the circuit which will be energized upon closing switch 329 and commencing with conductor 326, energy passes along conductor 333 and through the coil of solenoid means 334 of switch 335. Switch 335 is a normally open magnetically closed and remote controlled switch. Energy passing through said coil of solenoid means 334 of switch 335 connects with conductor 336, passes through then closed switch member 329, thence along conductor 337, and through commutator-switch device 338. This commutator-switch device 338 will be closed providing cam shaft 244 is in the proper position. A detailed consideration of all commutator-switch devices, herein employed, including said 338, is elsewhere herein given. The said proper position will be that the cam shaft 244 has made a complete cycle so that the saws 200 have been stroked and returned and the side clamps 83 have been fully retracted. Energy leaving commutator-switch device 338 will pass along conductor 339 and through switch 340. Switch 340 is a magnetically controlled switch moving in one direction by gravity and in the opposite direction by magnetic means. Switch 340 has two blades 341 and 342. Blade 342 is in normally closed position and blade 341 is in normally open position. Upon energizing the coil of solenoid means 343, blade 341 will be closed and blade 342 will move to open position. Thus energy on conductor 339 will pass along normally closed switch blade 342 of switch 340 and thence to conductor 344. Energy on conductor 344 passes through manual bundle motor switch 345 (which is closed during normal operation) and thence along conductor 346 to conductor 325. As a circuit has been energized which energizes the coil of solenoid 334, this will in turn close switch 335. After switch 335 has been closed by momentary contact in switch 329, switch 335 will be held in closed position by a circuit which may be traced as follows: Commencing with conductor 326, along conductor 333, through the coil of solenoid 334, and along blade 348 of switch 335. As switch 335 is closed, energy from blade 348 will travel thence along conductor 349, along conductor 350, along commutator-switch device 351 (which is closed as hereinafter explained), along conductor 352, through then closed bundle motor control switch 353, through then closed manual bundle motor switch 345, and along conductor 346 to conductor 325 thus maintaining energy through coil of solenoid 334 from conductors 326 and 325. The circuit through solenoid 334 is operated manually by the operator adjacent switch 329 and irrespective of the action of the operator adjacent switch 330.

However, as switch 347 is in open position, the bundle motor 196 will not be energized. In this connection it must be remembered that it is a purpose to have a switch 329 in convenient position relative to one operator and a second switch 330 in convenient position relative to a second operator. Thus if one operator desires to hold up the rotation of the bundle holding rotor because of incompletion of a tie, the breaking of a tie, or other circumstances, he may as both switches 329 and 330 must be closed to operate the bundle motor 196. We have traced the circuit established upon momentary contact of switch 329.

Assuming that the operator adjacent switch 330 may operate said switch after switch 329 has been closed, the following circuit will be established: Commencing from conductor 326, thence through coil of solenoid means 354, thence along conductor 355, and thence through then closed switch 330. The energy leaving switch 330 will connect with conductor 337. The energy on conductor 337 leaving switch 330 will follow the same circuit as the energy on conductor 337 leaving switch 329 and will thus connect with conductor 325—energizing coil of solenoid means 354 between conductors 326 and 325.

Upon energizing coil of solenoid 354, normally open magnetically closed and remote controlled switch 347 will move to closed position. Again because of momentary contact of a switch, as switch 330, the switch 347, similarly to switch 335, closes. Switch 347, once the same is closed by momentary contact, is held closed by the following circuit: Commencing with conductor 326, energy passes through coil of solenoid 354, thence through then closed blade 356 of switch 347, thence along conductor 350, thence through closed commutator-switch 351, along conductor 352, through switch 353, through switch 345, and along conductor 346 to conductor 325 thus maintaining coil of solenoid 354 energized between conductors 326 and 325. After switches 347 and 335 have both been closed, they are held closed; and an operating circuit to bundle motor 196 is established as follows: Commencing with conductor 326, thence through coil of solenoid 328, along conductor 357, along blade 358 of switch 335, along conductor 359, along blade 360 of switch 347, along conductor 361, and along conductor 346 to conductor 325.

Referring to Fig. 19, the shaft 160 carries a plurality of commutator-switch devices 351, 362, 363, 364, and 365. The said commutator-switch devices move one-third of a revolution or 120° while the bundle carrying rotor mechanism moves 90°. Referring to Fig. 35, the various center lines shown by a dot and dash line are the stop positions of the various commutator-switch devices. Commutator-switch device 351 stops with a contact between conductors 350 and 352 which are shown in the wiring diagram, Fig. 36. Just before reaching said stop position where there is contact established between conductor 350 and conductor 352, an open position is reached in said commutator-switch device 351 and the shaft 160, which is driven with the bundle motor 196, will coast far enough to reach the rest or stop position shown in Fig. 35 of the drawings. Upon interruption of the current between conductors 350 and 352, the coils of the solenoids 354 and 334 will be momentarily deenergized and immediately switches 347 and 335, and consequently switch 327 will move to open position. Upon opening of said switches, the bundle motor 196 will be de-energized, but it will coast far enough so that commutator-switch device 351 is left in closed position so that the circuits just described in connection with motor 196 may be started later by the operators upon operation of switches 329 and 330.

Figure 35:
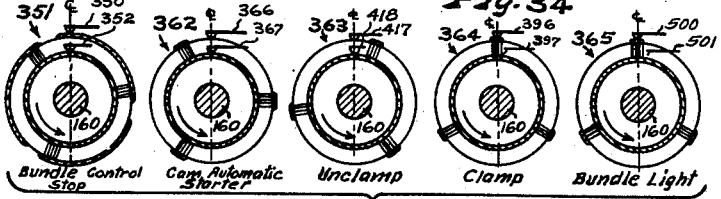
Fig. 35 is a somewhat diagrammatic view showing a series of commutator-switch devices that are operatively connected with bundle rotor driving means.

As commutator-switch device 362 is carried on shaft 160, a momentary contact will be established between conductors 366 and 367 before the shaft 160 reaches the rest or stop position (see also Fig. 35 as to the center line and the position of the contact members). Also, when the shaft 160 reaches its stop or rest position, commutator-switch devices 364 and 365 will be left in closed position as respects their contact members.

Again referring to the wiring diagram, Fig. 36, the cam motor 182 for driving cam shaft 244 will now operate because of the contact in commutator switch device 362. The circuit for operating said cam motor 182 may be traced as follows: Commencing with the output of switch 319, the control circuit for the cam motor 182 is connected therewith. By such connection to the output of the saw motor switch 319, the cam motor 182 cannot operate unless the switch 319 is closed to the saw motor 210. Energy along conductor 368 passes to conductor 366, thence to conductor 367 because of the contact in commutator-switch device 362, thence to conductor 369, along said conductor 369, along conductor 370, through manual cam motor switch 371 (this switch 371 is closed at all times for normal operation of the cam motor), thence along conductor 372, thence through coil of solenoid 373 and along conductor 374 to another terminal of the output of saw motor switch 319.

Thus when the coil of solenoid 373 is energized, the magnetic cam motor switch 375 closes and energy passes from conductors 324, 325 and 326 to cam motor 182.

Figure 34:
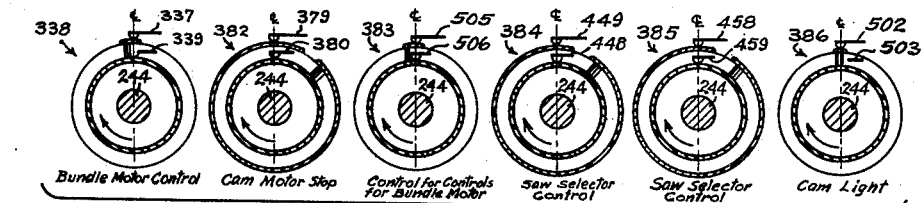
Fig. 34 is a somewhat diagrammatic view showing a series of commutator-switch devices that are operatively connected with the cam shaft mechanism and which time the operation of various parts of the device.

Commutator-switch device 362 provides for a momentary contact just before shaft 160 reaches its stop or rest position, see Fig. 35. However, this momentary contact closes magnetic cam motor switch 375, and after said magnetic cam motor switch 375 has been closed, a circuit is established for holding said switch in closed position which may be traced as follows: Commencing with conductor 324, thence along conductor 376, thence through then closed switch 375, thence along conductor 377, thence along conductor 379, and thence through then closed commutator-switch device 382. Commutator-switch devices 338, 382, 383, 384, 385, and 386 are mounted on shaft 244 (see Figs. 18, 20, and 21). Also, said commutator-switch devices provide contact as indicated by the showing of the commutator and connections as indicated in Fig. 34. At the rest position in the rotation of shaft 244, commutator-switch device 382 provides contact between conductors 379 and 380. This contact is maintained as will be indicated from an examination of Fig. 34 for almost one complete revolution of the cam shaft 244.

Energy on the conductor 380 passes therealong, thence along conductor 369, thence along conductor 370, thence through manual cam motor switch 371 which is normally closed, thence along conductor 372, thence through the coil of solenoid 373, thence along conductor 374, and through then closed saw motor switch 319. Thus while commutator-switch device 362 functions by momentary contact to close cam motor switch 375, the holding circuit for said cam motor switch 375 is maintained through commutator-switch device 382 and the circuit is maintained for almost a complete revolution as indicated by the showing of said commutator-switch device 382 in Fig. 34.

Rotation of shaft 244 will permit the side clamps 83 to complete a cycle of operation, and stroke the saws 200 for a complete cycle of operation, all as has been explained in connection with Fig. 18. The bundle which will be clamped by the side clamps 83 and sawed by the saws 200 will be the bundle in station C as has been previously explained.

When almost a complete revolution of cam shaft 244 obtains, the commutator-switch device 382 will cause an open circuit between conductors 379 and 380, thus de-energizing the coil of solenoid 373 and causing cam motor switch 375 to move to open position. While the interruption in the electrical current between conductors 379 and 380 is caused by commutator-switch device 382 just prior to the completion of a cycle of the cam shaft 244, the cam shaft 244 will coast so that the various commutator-switch devices 338, 382, 383, 384, 385, 386 will move to and stop at the rest positions shown in Fig. 34.

Commutator-switch device 382 serves to momentarily interrupt the current and permit cam motor switch 375 to move to open position. However, after such momentary interruption of the current, said commutator-switch device 382 moves to closed position so that it is in a position to function in a holding circuit for switch 375 the next time said switch 375 is energized.

During a complete revolution of the cam shaft 244, two of the saws 200 have been selected, by means hereinafter described, so that a bundle will be side clamped by side clamps 83 and sawn by said two selected saws 200 while the same is in station C. At this stage of the cycle of operation, the parts, in a brief summary manner, are located as next described. A bundle 44 is in station D and is clamped there by clamp means 70. Also, a bundle 44 is in station C which has been end trimmed at both ends, the side clamps 83 and the saws 200 which have operated on said bundle 44 in said station C have completed their cycle and have been completely retracted. There is a bundle in station B which has been clamped by the top clamp means 70. If in such position the operators place a bundle 44 in station A and move the same endwise, such endwise movement will operate switch 387 as has been previously described. When the operators place a bundle 44 in station A they move the same lengthwise sufficiently so that the individual boards of the bundle 44 will be aligned as they are urged against member 131 or member 139. The switch 387 is connected with said members 131 and 139 and closing of said switch 387 causes operation of the following circuit: Energy on conductor 326 passes along conductor 391, through coil of solenoid 343, and along conductor 393 to drop arm switches 394, which are in series. Drop arm switches 394 are shown in Fig. 12, and if the two sets of drop arms 100 are in a position to receive a bundle which may be in station D, and is released by the top clamp 70, then the drop arm switches 394 will be closed. This is a safety feature and insures that the top clamps 70 which are holding the bundle in station D may not be operated unless the drop arms are in a proper position to receive the bundle. Energy leaving drop arm switches 394 passes through clamp and bumper switch 387, which has been closed by the endwise movement of the bundle. Then the energy passes through an unclamp switch 395. This unclamp switch 395 is normally closed and is used by the operators to unclamp a bundle should they desire to further align it as will be hereinafter explained. Energy leaving unclamp switch 395 passes along conductor 396 and to commutator-switch device 364.

Commutator-switch device 364 is in closed position, see Fig. 35, as the shaft 160 is at rest position. Energy leaving commutator-switch device 364 passes along conductor 397, and thence along conductor 398 to conductor 325. This energizes coil of solenoid 343 between conductors 325 and 326. Upon energizing of solenoid 343, energy from 326 passes along conductor 391, thence along switch blade 341 of solenoid controlled switch 340, thence along conductor 399 and to limit switch 400 (see also Fig. 32.) The top clamp motor 197 by means described in connection with Fig. 32 is mechanically connected with said limit switch 400. Said limit switch 400 limits the rotary movement of motor 197 in both directions so that the cam drum 167 has a predetermined angular movement sufficient to completely clamp and unclamp the top clamps 70. One form of limit switch which may be used for such purpose, and is readily available on the market, is somewhat diagrammatically shown in Fig. 36. The cam 401, in one direction of travel of the top clamp motor 197, connects conductors 399 and 402 and disconnects conductors 403 and 404. As the motor 197 moves in said direction, first a connection is made between conductors 403 and 404 and then the connection between conductors 399 and 402 is broken. Also, when the motor is driven in the opposite direction the connection between the conductors 403 and 404 is maintained, and as the motor 197 continues to move in said direction, first connection is established between conductors 399 and 402 and then the electrical connection between the conductors 403 and 404 is broken.

As the apparatus is in a position to clamp a bundle in station A, the switch 400 will be now providing connection between conductors 399 and 402. Energy reaching conductor 402 passes therealong, and through the coil of solenoid 405 which operates clamp switch 406. Clamp switch 406 is normally open and is closed upon energizing of solenoid means 405. All of the blades of switch 406 are connected to open and close together. A similar switch 407 cooperates with switch 406 to reverse the phases and in turn the direction of rotation of top clamp motor 197. In accordance with standard practice there is a mechanical linkage between switches 406 and 407 so that both switches may not be closed at the same time.

Electrical energy in the coil of solenoid means 405 passes along conductor 408 to conductor 325. Thus the coil of solenoid 405 is energized and switch 406 closed. This causes energy from conductors 324, 325, and 326 to energize conductors 409, 410, and 411, and the clamp motor 197 turns in a direction to operate clamp 70 to clamp the bundle in station A.

Upon closing of the switch 406, a holding circuit is established holding said switch in closed position. The circuit may be traced as follows: Commencing with conductor 408, thence through the coil of solenoid 405, thence along conductor 402, through the limit switch 400 to conductor 399, thence to conductor 412, thence to conductor 413, thence through blade 414 of then closed switch 406, and thence along conductors 415 and 416 to conductor 326. Thus a holding circuit is provided for the coil of solenoid 405 from conductors 326 and 325. This holding circuit thus described will continue to hold the switch 406 in closed position and cause rotation of top clamp motor 197 until the top clamp motor 197 travels its maximum distance in one direction as determined by the limit switch 400. Upon reaching said full travel in one direction, electrical connection between conductors 399 and 402 is disconnected, and electrical connection obtains between conductors 403 and 404, thus permitting operation of the switch 407 to reverse the direction of travel of the top clamp motor 197 as will be hereinafter described. Rotation of the top clamp motor 197 in one direction angularly moves the cam drum 167 which in turn causes the bundle in station A to be clamped and causes the bundle in station D to be unclamped. Such operation occurs upon the energizing and closing of switch 406 and is spoken of as the clamping operation. Energizing of switch 407 will cause the top clamp motor 197 to move in the opposite direction for purposes described in connection with Figs. 28 to 31.

The energizing of clamp switch 340 in turn causes the energizing of clamp switch 406 and in turn rotation of top clamp motor 197. In view of the fact that top clamp switch 406 was provided with a holding circuit which was maintained until operation of the limit switch 400, any interruption in the circuit which includes clamp switch 340 will not cause an interruption in the circuit through switch 406. The circuit through the switch 340 will be broken upon rotation of the bundle shaft 160 interrupting the connection made by the commutator-switch device 364 (see also Fig. 35 as to the period of contact by commutator-switch 364).

After the bundle in station A has been properly tied by the operators, after the same has been clamped by the top clamp, the operators may jointly operate switches 329 and 330 which will start rotation of the bundle holding rotor mechanism.

As has been previously described, when a bundle is moving between stations B and C the individual length of a bundle serves to cooperate with trigger members 146 and associated switch members so that two saws are selected to saw the bundle in station C which will be the maximum commercial length obtainable from a given bundle. The various trigger mechanisms which may be depressed by a bundle are shown in the wiring diagram Fig. 36 and some are also shown in Figs. 2 and 3 and numbered 146. The saws in this device are spaced so that the space between the first two saws at the head end of the machine is one foot, and the spacing between the next saws is four feet and thereafter the spacing is two feet for the remaining saws. The trigger member for the first saw is positioned between the first and second saws; for the second saw, between the second and third saws and adjacent the second saw; and for all other saws just ahead, (i. e., toward the head end of the machine) and adjacent the saw that is operated. The respective trigger members 146 connect respectively with switch mechanism carrying blades 429 to 439 respectively.

Assuming that a bundle, containing boards which may be cut to a maximum four foot length, is carried by the bundle rotor mechanism and is moving between stations B and C, one of the end portions of said bundle (i. e., the head end as considered in the machine) will contact with a trigger member 146 connected with a blade 430 and close a contact between conductors 440 and 441. Also, the trigger mechanism 146 connected with the switch containing the blade 431 will be urged by the other end of the bundle (i. e., the foot end as considered in the machine) to cause a connection between conductor 440 and conductor 442. The circuits thus started may be traced as follows: Commencing with conductors 325 and 326, the same are connected with conductors 443 and 444. The conductors 443 and 444 are shown as being connected with a transformer 445 in order to permit the use of reduced voltage in the control circuit. However, such is obviously not an essential. The secondary energy leaving transformer 445 passes along one conductor 446 through normally closed manual selector switch 447 (this switch is normally and manually closed during operative periods), thence along conductor 448, and through then closed commutator-switch device 384. As the shaft 244 carrying commutator-switch devices 384 and 385, among others, is stopped at the time of rotation of the bundle rotor assembly, there will be electrical connection established by said commutator-switch device 384 between conductors 448 and 449. Energy passes along conductor 449 and thence to conductor 450. Energy on conductor 450 passes along conductor 451, thence through coil of solenoid 452 of switch mechanism 453. The energy then passes along conductor 454, and thence through normally closed blade 455 of switch member 456. This blade 455 is in closed position as switch 456 is not energized and is energized only in response to movement of trigger 146 of switch mechanism carrying blade 432 as will appear. The energy then passes along conductor 457, along blade 432, along conductor 442, thence along blade 431 (which is then closed because of the individual length of the bundle), thence along conductor 440, thence along conductor 458, and to commutator-switch device 385. As previously explained commutator-switch device 385 is closed at this period of the cycle and energy therefore passes through said commutator-switch device 385 and to conductor 459. Energy on conductor 459 passes to conductor 460 thus completing the circuit through coil of solenoid 452 between the secondary conductors 460 and 446 of the transformer 445.

Energizing of solenoid 452 closes switch 453, and establishes the following circuits: Energy on conductor 450 passes to conductor 461, thence through coil of solenoid 462, thence through blade 463 of switch 453 (which is now closed), thence along conductor 464, thence along conductor 465, and thence to conductor 458. As previously explained, conductor 458 is connected with conductor 460, and also conductor 450 connects with conductor 446; thus the coil of solenoid 462 is energized between conductors 460 and 446. The energizing of the coil of solenoid 462 moves the armature-link 228 and in turn adjusts the clevis 223 (see Figs. 22 to 26 inclusive), and through the mechanism described in connection with said figures selects the four foot saw as one of the saws to be stroked through the foot end portion of a four foot bundle which is clamped and at rest in station C.

As the contact between the bundle and the trigger mechanism operating blade 431 is substantially a mometary contact, a hold-in circuit is provided for the switch mechanism 452. This hold-in circuit comprises the conductors 450 and 451, coil of solenoid 452, conductor 454, conductor 466, through then closed switch blade 467 of switch 453, conductor 468, and conductors 464 and 465. As previously explained, conductors 450 and 465 connect respectively with conductors 460 and 446. The hold-in circuit through the coil of solenoid 452 is established through commutator-switch devices 384 and 385 and as shown in Fig. 34, such commutator-switch devices 384 and 385 are carried by shaft 244. As the cam shaft 244 almost completes a revolution (during which the saws are stroked and the clamps on the side of a bundle are applied and released), the commutator-switch devices 384 and 385 cause momentary interruption in the circuit. This momentary interruption in the holding circuit, above described, by the commutator-switch devices 384 and 385 interrupts energy between conductors 449 and 458 and one of the circuits established between said conductors will be through the coil of solenoid 452 thus causing solenoid 452 to be de-energized and the switch 453, at such time, moves to its normal open position shown in Fig. 36. The other end portion of the said four foot bundle (i. e., the head end portion) will cause the establishment of a circuit through switch member 469 which will be described. Also, as switch 469 obtains its energy from conductors 449 and 458, such switch 469 will also be de-energized at the same time with said switch 453 so that the mechanism may select the proper saws for the next bundle traveling between stations B and C which may be of a different length than that described in connection with a four foot bundle.

The said other or head end of said four foot bundle through contact with trigger member 146 connected with blade 430 will establish the following circuit. Energy from conductor 460 will be on conductor 440 as previously described. Energy from said conductor 440 will pass through then closed blade 430, thence along conductor 441, thence through blade 429 which will connect conductors 441 and 470 as a bundle has not operated the trigger 146 connected with blade 429. It is to be remembered that for illustration a four foot length bundle was assumed, and such length bundle, being an even length bundle, will not depress the trigger mechanism 146 connected with the blade 429. Energy on conductor 470 passes therealong, and passes through the then closed blade 471 of switch mechanism 472. Switch 472 is normally in the position shown in Fig. 36, and its position does not change unless the trigger mechanism 146 connected with the blade 429 has been depressed by a bundle. Energy leaving the blade 471 of switch 472 passes along conductor 473 and through the coil of solenoid 474. Energy then passes along conductor 475 and thence along conductor 476 to conductor 449. The circuit has been previously traced showing that at this period of the cycle of operation conductors 440 and 449 will be connected respectively with conductors 460 and 446. Upon energizing of the coil of solenoid 474, a hold-in circuit for the solenoid 474 will be established commencing with conductor 465, along conductor 477, through then closed blade 478, along conductor 479, along conductor 473, through coil of solenoid 474, along conductor 475, and along conductor 476 to conductor 449 thus maintaining a holding circuit for the coil of solenoid 474 between conductors 449 and 465. The purpose of this hold-in coil for the solenoid 474 is identical with the purpose for the hold-in coil of solenoid 452. The energizing of the solenoid 474 causes a further circuit between conductors 449 and 465 to select the saw at the said one foot station. This circuit may be traced as follows: Commencing with conductor 449, thence along conductor 476, thence along conductor 480, thence through coil of solenoid 462', thence through then closed blade 481, and thence along conductor 477 to conductor 465. The energizing of solenoid 462' moves the armature-link means 228' so said saw at said one foot station is caused to be stroked.

At this stage of the cycle, it will be remembered, the cam shaft 244, which is driven by the cam motor 182, makes a complete revolution during the period that the bundle rotor assembly is at rest. This one revolution of the cam shaft 244 causes two selected saws to be stroked forward and back and causes the side clamp members 83 to be applied and retracted. Just before a complete revolution of the cam shaft 244, the commutator-switch devices 384 and 385 pass through momentary open circuit position, and any selected switch mechanism, for strokingly engaging the proper saw with the cam shaft 244 so that said saw may be stroked, will be brought back to its normal or rest position before the cam shaft completes its cycle, and thus also before the bundle rotor mechanism may be rotated for its next quarter of a revolution.

Assuming that the bundle rotor mechanism has been started to rotate again for another period of one-quarter of a revolution, the next bundle which is passing between stations B and C will engage with trigger mechanisms 146. In this instance we may assume that a bundle, which will trim out to a length of nine feet, is involved. With such a length bundle, the trigger 146 connected with blade 429 will be depressed, the trigger 146 connected with the blade 430 (one foot station) will be depressed, the trigger 146 connected with the blade 431 (five foot station) will be depressed, the trigger 146 connected with the blade 432 (seven foot station) will be depressed, and the trigger 146 connected with the blade 433 (nine foot station) will also be depressed. All other trigger mechanisms 146 toward the foot end of the machine will not be depressed and will be in the position shown in the wiring diagram Fig. 36. As previously described in connection with the four foot bundle, when the rotor assembly is moving between stations B and C, conductors 458 and 449 will be energized. Commencing with conductor 458 energy will pass along conductor 440, thence through blade 429 to conductor 482 (as the bundle we have assumed is an odd length bundle, it will depress trigger mechanism 146 connected with blade 429, and blade 429 will connect conductors 440 and 482). Energy on conductor 482 passes through coil of solenoid 483 and along conductor 484 to conductor 449—thus energizing the coil of solenoid 483 between conductors 449 and 458. The energizing of solenoid 483 will close the switch 472 and close a holding circuit for the switch 472 which is identical with the holding circuit described in connection with switch 469. Also, the closing of said switch 472 will operate an armature-link means 228 similar to the mode of operation described in connection with the selector means for the saw at the one foot station, and for the saw at the five foot station. In the interest of brevity, a detailed consideration of the circuits, which operate with the saw operating at the head end of an odd length bundle and functioning in response to operation of switch 472, is not here given as the same will be apparent from an examination and comparison of the matters illustrated on the wiring diagram Fig. 36.

With an odd length bundle the trigger mechanism 146 connected with the blade 430 at the one foot station will be depressed, however, there will be no circuit established to switch 469 as energy on conductor 440 passing along then closed switch blade 430 will travel along conductor 441, but will then reach an open circuit as the blade 429 connects between conductors 440 and 482 and there is no connection between conductors 441 and 470.

The trigger 146 connected with the blade 431 at the five foot station will be depressed, but no circuit will be established to switch 453 as the blade 431 will connect conductor 440 to conductor 442 and conductor 442 will reach an open circuit position as the blade 432, connected to the trigger 146 at the seven foot station, will be depressed and provide connection between conductor 440 and conductor 485 and disconnect conductor 442 from conductor 457. The trigger 146 connected with the blade 432 at the seven foot station will likewise be depressed and will provide a connection between conductor 440 and conductor 485. Again the conductor 485 will run into an open circuit as the blade 433 connected with the trigger mechanism at the nine foot station is depressed and connects energy on conductor 440 with conductor 486. As the trigger mechanism 146 connected with the blade 433 is the last trigger mechanism depressed by the bundle which we have assumed, then all of the remaining trigger mechanisms 146 toward the foot end of the machine will be up. Therefore, there is an electric connection by the blades 433 and 434 between conductors 440, 486, and 487. Energy on conductor 487 will pass through interlock blade 488 (which is similar to blade 455) and thence along conductor 488' to switch mechanism 495 (which is similar to either of the previously described switch mechanims 472 or 453, and in the interest of brevity is not here further described). Energy leaving said switch mechanism 495 will pass along a conductor 489 which is similar to the conductor 450 of switch 453. Thus the switch mechanism 495 is energized between conductors 449 and 440, and the armature-link means 228 of the saw operating means at the nine foot station is properly positioned so that the saw at such station is stroked.

The switch blade 455 of the switch member 456 is an interlock safety switch, so that when a switch 456 is energized which would mean the saw at the seven foot station is being stroked, then a switch in the circuit to the saw at the five foot station is also interrupted by switch blade 455 to further insure that it is impossible to stroke the saw at the five foot station.

There is also the same safety feature interlock between the first saw and the second saw at the one foot station. Whenever the circuit is established so the saw operated by switch 472 or the first saw is being stroked; then the switch blade 471 which is in the circuit to the switch 469 of the second saw is moved to open position, thus further eliminating possibility of the stroking of the saw at the one foot station when the saw at the head end of the machine is being stroked.

While there have been shown saws spaced as above indicated, it is to be understood that the same is not a limitation, but merely shows one commercial adaptation of this invention. Furthermore, as the parts duplicate themselves, it is felt that a description of the saws above indicated is sufficient, and further explanation would be merely duplicative. It is to be noted that where the bundle is an odd length bundle (i. e., odd number of feet in length), the head end will be sawn by a saw controlled by switch 472 and the foot end of the bundle will be sawn by a saw controlled by a switch such as switch 495 for a nine foot bundle. In the event of an even length bundle, (i. e., even number of feet in length), the head end of the bundle will be sawn by a saw controlled by the operation of switch 469, and if the bundle is an eight foot bundle, the foot end of the bundle will be sawn by a saw controlled by switch 495. From the foregoing it appears obvious that a bundle may be sawn at one foot intervals from any length, commencing at four foot and ending at twenty-one foot, by the apparatus which has been described herein, and that the description of the mechanisms for sawing other lengths will duplicate that already given.

In the event that it is desired to have manual means to stroke any one of the saws other than those which will be automaticaly stroked because of the length of the individual bundles, switches may be provided as switches 490 and 491. Often in saw mills large orders are received for one length, as nine foot length bundles, and it is necessary to provide three cuts in the longer bundles so nine foot bundles may be accumulated for such orders. Manually operable switch 490 connects between conductor 440 and conductor 492. From the foregoing description wherein energy on conductor 488' operated switch mechanism 495, it is obvious that energy from conductor 440 through manually operable switch 490 to conductor 492 will operate switch mechanism 495, and a bundle of a length of either eight or nine feet may be cut.

As switch 491 connects conductor 440 with conductor 494 which in turn operates switch mechanism 494', it is obvious that by manual operation of switch 491 operation of the saw controlled by switch 494' may obtain, and bundles may be cut, to provide at the head portion thereof, a bundle of ten or eleven feet depending upon whether or not the saw operated by the switch 472 or the saw operated by the switch 469 is caused to operate. Obviously all or a portion of the switch mechanisms at the various stations may be provided with manual switches similar to switches 490 and 491 and their conductors 492 and 494—the number and use thereof depending upon the individual desires of a particular mill.

The shaft 160 which moves with the bundle rotor mechanism and is connected therewith carries a plurality of commutator-switch devices 351, and 362 to 365 inclusive. The commutator-switch device 362 electrically interlinks the operation of the cam shaft 244 with the operation of the shaft 160. Also, the shaft 244 carries a plurality of commutator-switch devices 338, and 382 to 386 inclusive, and commutator-switch device 338 in turn controls the operation of the bundle rotor mechanism. In order to insure proper timing between the shafts 160 and 244, the following electrical apparatus is provided: Commencing with conductor 374 (connected to the output of saw motor 210), thence through coil of solenoid 373, thence along conductor 372, thence through normally closed switch 371, thence along conductors 370 and 380, thence through commutator-switch device 382 (this is closed and provides connection between conductors 380 and 379 when the cam shaft 244 is at rest), thence along conductor 379, and thence along conductor 496 to conductor 496'. If switch 378 is momentarily closed, energy will pass from conductor 496' through switch 478 to conductor 368 which is connected to the other source, or output of saw motor 210. Thus coil of solenid 373 is energized and switch 375 closed. The hold-in circuit for switch 375 will maintain it closed until commutator-switch 382 opens the circuit, the said hold-in circuit comprising: Conductor 376, closed switch 375, conductor 377, conductor 379, commutator-switch 382, conductor 380, conductor 370, closed switch 371, conductor 372, coil of solenoid 373, and conductor 374—said first conductor 376 and the last conductor 374 providing a source of energy for coil of solenoid 373. This will start cam motor 182 and the same will run until it is stopped by operation of commutator-switch device 382. This member 382 is normally closed and is the means stopping cam motor 182 normally. Therefore, if the cam motor 182 and cam shaft 244 should get out of time with the bundle shaft 160, we may (by momentary contact in switch 378) start the cam motor 182 and the same will run until stopped by the normal stopping means (commutator-switch 382) so that shaft 244 will move to the position it should assume with the apparatus at rest. Thereafter when the bundle rotor mechanism and the shaft 160 are started by joint operation of switches 329 and 330, the said bundle rotor mechanism and shaft 160 will stop at their proper position by commutator-switch device 351. Thus timing of shafts 160 and 244 is accomplished.

In order to indicate whether shafts 160 and 244 are properly timed commutator-switch devices 365 and 386 are provided. These members provide respectively circuits for lamps 497 and 498 and if said lamps are illuminated while the machine is at the rest position the said shafts 160 and 244 and mechanisms connected therewith are properly timed.

The circuit for the lamp 497 starts with conductor 460 (secondary wire of transformer 445), along conductor 499, through lamp 497, along conductor 500, and through commutator-switch device 365. This commutator-switch device 365 (see Fig. 35) has its contacts arranged so the closed position is established when the center line of all commutator-switch devices carried by shaft 160 is at the normal rest position. Energy leaving commutator-switch 365 passes along conductor 501, through normally closed switch 447 and to conductor 446—the other secondary wire of transformer 445. Thus illumination of lamp 497, when the apparatus is at rest, will indicate that the bundle shaft 160 and parts connected therewith are in proper position.

The circuit for the lamp 498 starts with conductor 460 (secondary wire of transformer 445), along conductor 499, through lamp 498, along conductor 502, and through commutator-switch device 386. This commutator-switch device 386 (see Fig. 34) has its contacts arranged so the closed position is established when the center line of all commutator-switch devices carried by shaft 244 is at the normal rest position. Energy leaving commutator-switch 386 passes along conductors 503 and 501, and thence through normally closed switch 447 to conductor 446—the other secondary wire of transformer 445. Thus illumination of lamp 498, when the apparatus is at rest, will indicate that the cam shaft 244 and parts connected therewith are in proper position.

In the event that it should be desired to operate the bundle rotor assembly and bundle shaft 160, when the cam shaft 244 and bundle shaft 160 are for some reason out of time, the switch 353 is provided. The circuit starts with conductor 325, then conductor 346, through normally closed switch 345, through switch 353 to conductor 505, through commutator-switch 383, along conductors 506 and 357, through coil of solenoid 328 and to conductor 326—thus energizing the coil of solenoid 328 between conductors 325 and 326 which closes switch 327 and operates bundle motor 196. This circuit through switch 353 is primarily for maintenance purposes and the timing of shafts 160 and 244 is accomplished by switch 378 and switches 329 and 330 as previously described.

As shown in Fig. 3 of the drawings, downward movement of bar 232 operates switch 395. By a circuit which will be described, operation of switch 395 in turn operates switch mechanism 422 which in turn operates switch mechanism 407 causing movement of top clamp motor 197 so that the operators may release the top clamp 70 on a bundle located in station A. This will permit the operators to release the clamp 70 to further align a bundle should the same be necessary. The movement of the bar 232 in an upward direction operates emergency switch 507 to open the master switch 301 so that should an emergency arise, the operators can immediately de-energize all parts of the electrical mechanism. The circuit for said switch 507 has previously been described and comprises: conductor 304, coil of solenoid 302, conductor 305, normally closed switch 303, conductor 306, normally closed stop switch 310, conductor 311, normally closed stop switch 507, conductor 315, and thence through closed switch 301 to the other source of energy-conductor 309.

The circuit which includes switch 395 for unclamping a bundle in station A may be traced as follows: commencing with conductor 325, along conductor 398, through then closed unclamp switch 395, along conductor 508, along conductor 419, through coil of solenoid 420, and along conductor 421 to the other source of electrical energy-conductor 326. Energizing of the coil of solenoid 420 will close switch 422 and the following circuit will be established: commencing with conductor 326, along conductor 421, through then closed switch 422, along conductor 423, along conductor 403, and through then closed limit switch 400 to conductor 404. Energy on conductor 404 connects with conductor 424, thence through coil of solenoid 425, and thence to conductor 325 the other source of electrical energy—thus energizing solenoid 425 between conductors 325 and 326. Energizing of solenoid 425 will close switch 407 and the cam motor 197 may be rotated in a direction to unclamp the top clamp 70 and the motor will continue to run in this direction until the circuit is opened by the limit switch 400 interrupting connections between conductors 403 and 404. After a bundle has been unclamped by the operators in station A, then upon proper aligning of the bundle and urging the same against an operating clamp bumper switch 387, the direction of rotation of the motor 197 is reversed and the bundle may be again clamped and the operation may continue in the normal manner hereinbefore described. Of course if the operators release the unclamp switch 395 and maintain the bundle urging the clamp switch 387 in its closed position, then through the various mechanisms hereinbefore described, switch 407 will move to open position and switch 406 will move to closed position, and the top clamp motor 197 will move in a direction to clamp a bundle in station A.

Referring to Figs. 28 to 32 inclusive, the cam drum 167 is driven by the motor 197. Also, the rollers 176 are carried by the bundle rotor assembly and are therefore driven by the bundle motor 196. In Fig. 29 of the drawings there is shown a position where the device is at rest and the clamps in station A are in unclamped position, the bundle in station B has been clamped, the bundle in station C has been clamped, and the bundle in station D remains clamped.

Referring to Fig. 30, a position is shown where the rollers 176 have remained at rest with the bundle rotor mechanism, and the cam drum 167 has been angularly moved in response to movement of the top clamp motor 197 in a direction responsive to the closing of switch 406. With such relative movement between the cam drum 167 and the rollers 176, the bundle in station A has been clamped, the bundle in station B remains clamped, the bundle in station C remains clamped, and the bundle in station D is unclamped.

Thereafter, if the cam drum 167 is driven in a direction responsive to control by switch 407, and at the same time, the bundle rotor assembly and rollers 176 connected therewith are moved in the same direction and at substantially the same time and speed, then the bundles may be moved from one station to another and the position of the clamps will not be changed. Thus the bundle in station A moves to station B and the clamps remain clamped. The bundle in station B moves to station C and the clamps remain clamped. The bundle in station C moves to station D and the clamps remain clamped, and also the unclamp mechanism formerly in station D moves to station A and the clamps remain in an open position. The circuit for providing movement of the cam drum 167 forward with the movement of the bundle rotor mechanism and rollers 176 may be traced as follows: Commencing with conductor 326, thence along conductor 421, thence through coil of solenoid 420 thence along conductor 419, thence along conductor 417, an thence through commutator-switch device 363. The commutator-switch device 363 is carried by the bundle rotor mechanism and on bundle rotor shaft 160 so that after the bundle rotor mechanism has started to rotate, a momentary contact is established through commutator-switch device 363 between conductors 417 and 418. Energy on conductor 418 passes therealong, and along conductor 398 to conductor 325—thus energizing solenoid 420 between conductors 325 and 326. This closes magnetic switch 422 which switch in turn closes switch 407 as has been previously described. Switch 407 thus closed by momentary contact in the commutator-switch device 363 is maintained closed through a holding circuit which includes limit switch 400. Also, by reason of the circuit to switch 407, which was previously explained, switch 407 will be maintained closed to provide full angular movement in one direction of motor 197 as determined by operation of limit switch 400. The nature of limit switch 400 has been previously described somewhat in connection with this wiring diagram Fig. 36 and has also been discussed in further detail in connection with Fig. 32.

By way of brief summary the mode aof operation of this device is as follows: First switches 303, 322, 345, 371, and 447 are closed. Then upon momentary contact by switch 307, the master switch 301 is closed. Thereupon saw motor 210 will rotate. For a place of beginning, we will assume that a bundle is in station D and is clamped, a bundle is in station C which has been sawn, and a bundle is in station B which has been clamped by the top clamp 70. In such position when the operators place a bundle in station A and move the same endwise such bundle will engage and operate switch 387 and through the circuits described the clamp motor 197 will operate the clamps so that the bundle in station A will be clamped, the clamps will be maintained on the bundle in station B, the clamps will be maintained on the bundle in station C, and the clamp formerly engaging the bundle in station D will be released. At this stage of the cycle the bundle rotor mechanism is at rest and the operators may place tie members about the bundle in station A. Should the operators desire to realign the bundle in station A for any reason, by operation of switch 395 the clamp 70 may be released. After the bundle has been properly realigned then upon release of switch 395 the clamp 70 will be reapplied. Then the operators may by closing switches 329 and 330 cause bundle motor 196 to rotate which will in turn rotate the bundle rotor mechanism. The bundle motor 196 will not rotate until the closing of the last of said switches 329 and 330. Shortly after the bundle motor 196 starts to rotate to move the bundle rotor assembly through an arc of 90°, the top clamp motor 197 operates in a reverse direction so that as the bundle in station A moves to station B the position of the top clamps 70 are not changed, and the top clamps remain clamped. Also, the bundles moving from station B to C and from station C to D still remain in clamped position. Also, the open clamp formerly in station D will move to station A and remain in open position. As a bundle moves between stations B and C, a number of trigger members 146 are engaged by the bundle dependent upon the length of the bundle so that two saws 200 are selected by movement of armature-link means 228 so that when the bundle is at rest in station C, the two selected saws 200 will trim said bundle to the desired length, depending upon the original rough length of the bundle. After the bundle rotor assembly has come to rest in station C a commutator-switch device carried by the bundle rotor assembly will start rotation of the cam motor 182 and such cam motor will provide the rotary motion to apply the side clamps 83 and thereafter return said side clamps to their rest position, and also said cam motor 182 will provide the rotary motion to stroke selected saws 200. After the cam motor 182 has made its regulated angular motion it will provide connection between electrical commutator-switch devices so that the bundle motor 196 may be operated by the operators. The further cycles of operation of the mechanism will be apparent from the foregoing description.

Obviously, changes may be made in the forms, dimensions and arrangement of the parts of this invention, without departing from the principle thereof, the above setting forth only preferred forms of embodiment.

I claim:

1. In a device of the class described, bundle rotor means mounted for intermittent rotary movement; bundle supporting means on said bundle rotor means, said bundle supporting means comprising a fixed support carried by said bundle rotor means, and clamp means movable toward and away from said fixed support; clamp operating and bundle aligning means positioned in longitudinal alignment with and operable by longitudinal movement of a bundle supported by said bundle supporting means, whereby longitudinal movement of a bundle against said clamp operating and bundle aligning means will align the bundle and cause clamping of the same; and driven saw means mounted for stroking movement into and out of the path of an aligned and clamped bundle supported by said bundle supporting means.

2. In a device of the class described, bundle rotor means mounted for intermittent rotary movement; bundle supporting means on said bundle rotor means for securely fixing a bundle as respects said rotor means; a plurality of swingingly mounted driven saws normally positioned out of bundle cutting position; saw stroking means for swingingly stroking saws through a bundle and returning them to normal positions; and saw stroking control lever means positioned in the path of travel of a bundle carried by said bundle supporting means, determining by contact with a moving bundle the saws to be stroked, and operatively connecting said saw stroking means with saws, selected from said driven saws by said control lever means, when the rotor means is at rest.

3. In a device of the class described for end trimming bundles comprising a plurality of pieces of stock, bundle rotor means mounted for intermittent rotary movement; bundle supporting means on said bundle rotor means, said bundle supporting means comprising a fixed support carried by said bundle rotor means and top clamp means movable toward and away from said fixed support and holding said pieces side by side in the bundle and the bundle against said fixed support; top clamp operating means; side clamp means movable into and out of side clamping and bundle aligning position relative to the pieces forming a bundle supported by said supporting means and held in side by side relation by said top clamp means; side clamp operating means; and spaced apart driven saw means mounted for simultaneous stroking movement into and out of the path of a bundle supported by and clamped in said bundle supporting means and side clamped and aligned by said side clamp means to simultaneously trim both ends of said bundle.

4. In a device of the class described, bundle rotor means mounted for movement about a horizontal axis; external bearings carried on the periphery of said bundle rotor; annular supporting track means, with a longitudinal bundle loading opening therein, concentrically positioned as respects said motor and engaging said external bearings, and mounting said bundle rotor for rotary motion; bundle supporting means on said bundle rotor; and spaced apart driven saw means mounted for simultaneously stroking movement into and out of the path of a bundle supported by said bundle rotor to simultaneously trim both ends of said bundle.

5. In a device of the class described, bundle rotor means mounted for intermittent rotary movement; bundle supporting means on said bundle rotor means for securely fixing a bundle as respects said rotor means; a plurality of driven saws; a plurality of swingingly mounted arbors, each supporting one of said saws normally out of bundle cutting position; saw stroking means connectable with each of said arbors for swingingly stroking the saw on an arbor through a bundle and returning the saw to normal position; a plurality of dog means each movable into and out of engaging relation between an arbor and the saw stroking means; and dog control lever means positioned in the path of travel of a bundle carried by said bundle supporting means, operable by a moving bundle, and operatively connecting a swingingly mounted arbor, determined by said dog control lever means and in turn the length of an individual bundle, with the saw stroking means when the rotor means is at rest.

6. In a device of the class described, bundle rotor means mounted for intermittent rotary movement; bundle clamp means on said bundle rotor means; cam track providing means mounted for rotary movement, said cam track means comprising a plurality of longitudinally spaced co-axial tracks of varying diameters; clamp control means carried by said rotor and having roller means operatively engaging one of said tracks of varying diameter; adjusting means providing relative longitudinal movement between said cam track providing means and said roller means, whereby upon longitudinal adjustment of said adjusting means the movement imparted to said roller means may be adjusted; and means selectively providing relative and similar motions between said cam track means and said bundle rotor, whereby a position of said clamp means obtained by said relative motions during stationary position of said rotor may be retained during said similar rotations.

7. In a device of the class described, bundle rotor means mounted for intermittent rotary movement; bundle supporting means on said bundle rotor means; electrical contact means mounted for opening and closing movement by movement of said bundle rotor means; second and manually initially closed electrical contact means mounted for opening movement and final closing movement when the rotor means is respectively moving and at rest; a plurality of swingingly mounted driven saws; saw stroking means; and electrically controlled means for said saw stroking means having a circuit including both said electrical contact means, whereby stroking of said saws is in timed sequence with the rotation of said bundle rotor means and while the bundle rotor means is at rest.

8. In a device of the class described, bundle rotor means mounted for intermittent rotary movement; movably mounted clamp means for supporting a bundle on said bundle rotor means; electrical contact means mounted for opening and closing movement by movement of said bundle rotor means; manually operable electrical contact means; clamp operating means; and electrically controlled means for said clamp operating means having a circuit including both said electrical contact means, whereby operation of said clamp means is in timed sequence with the rotation of said bundle rotor means as well as said manually operable electrical contact means.

9. In a device of the class described, bundle rotor means mounted for intermittent rotary movement; electrically operable movably mounted clamp means for supporting a bundle on said bundle rotor means; electrical contact means mounted for opening and closing movement by movement of said bundle rotor means; movably mounted bundle receiving means for receiving a bundle discharging from said bundle rotor; electrical switch means operated by movement of said movably mounted bundle receiving means; and electrically controlled means for said electrically operable clamp means having a circuit including aid electrical contact means and said electrical switch means, whereby operation of said clamp means is in timed sequence with the rotation of said bundle rotor means and said movably mounted bundle receiving means.

10. In a device of the class described, bundle rotor means mounted for intermittent rotary movement; bundle supporting means on said bundle rotor means; electrically controlled bundle rotor driver means; a plurality of starting switch means; start controlling means for said driver means including a circuit responsive to conjoint action of said plurality of starting switch means, whereby starting of said bundle rotor is responsive to conjoint action of a plurality of switch means; bundle rotor controlled switch means operatively connected with and operated by said bundle rotor means; and stop controlling means for said driver means including a circuit responsive to said bundle rotor controlled switch means, whereby said bundle rotor, after starting, will have a predetermined angular movement.

11. In a device of the class described, bundle rotor means mounted for intermittent rotary movement; bundle supporting means on said bundle rotor means; electrically controlled bundle rotor driver means; starting switch means; start controlling means for said driver means including said starting switch means; bundle rotor controlled switch means operatively connected with and operated by said bundle rotor means; and stop controlling means for said driver means including a circuit responsive to said bundle controlled switch means, whereby said bundle rotor, after starting, will have a predetermined angular movement.

12. In a device of the class described, bundle rotor means mounted for intermittent rotary movement; bundle supporting means on said bundle rotor means; first electrical contact means mounted for opening and closing movement with said bundle rotor means; a plurality of swingingly mounted driven saws; electrically controlled saw stroking shaft means; second electrical contact means mounted for opening and closing movement with said saw stroking shaft means; electrically controlled means for said saw stroking shaft means having a circuit including said first electrical contact means, whereby stroking of said saws is in timed sequence with the rotation of said bundle rotor means; and electrically controlled means for said bundle rotor means having a circuit including said second electrical contact means, whereby operation of said bundle rotor means is in timed sequence with the rotation of said saw stroking shaft means.

13. In a device of the class described, bundle rotor means mounted for intermittent rotary movement; bundle supporting means on said bundle rotor means; first electrical contact means mounted for opening and closing movement with said bundle rotor means; bundle clamp means; electrically controlled clamp operating shaft means; second electrical contact means mounted for opening and closing movement with said clamp operating shaft means; electrically controlled means for said clamp shaft means having a circuit including said first electrical contact means, whereby operation of said clamp means is in timed sequence with the rotation of said bundle rotor means; and electrically controlled means for said bundle rotor means having a circuit including said second electrical contact means, whereby operation of said bundle rotor means is in timed sequence with the rotation of said clamp operating shaft means.

14. In a device of the class described, bundle supporting means; a plurality of longitudinally spaced swinging saws, the first two being spaced at a distance of one unit and the remainder being spaced at distances of even multiples of said unit; first stop means arresting longitudinal movement of a bundle at an operative position relative to one of said longitudinally spaced saws spaced apart one unit; second stop means, movable into and out of bundle stopping positions, arresting longitudinal movement of a bundle in operative position relative to the other of said saws spaced apart one unit; bundle operated stop moving means operable by a bundle resting thereon and moving said second stop means out of operative bundle stopping position; and means for selectively and simultaneously operating the first saw with another spaced saw or selectively and simultaneously operating the second saw with another spaced saw, whereby bundles may have both ends sawn simultaneously to provide bundles of even or odd numbers of units of length.

15. In a device of the class described, bundle supporting means; a plurality of longitudinally spaced swinging saws, the first two being spaced at a distance of one unit and the remainder being spaced at distances of even multiples of said unit; first stop means arresting longitudinal movement of a bundle at an operative position relative to one of said longitudinally spaced saws spaced apart one unit; second stop means, mechanically linked with said first stop means, vertically reciprocable into and out of bundle stopping positions, and arresting longitudinal movement of a bundle in operative position relative to the other of said saws spaced apart one unit; bundle operated stop moving means operable by a bundle resting thereon and moving said second stop means out of operating bundle stopping position and moving the first stop means out of and into bundle stopping position; and means for selectively and simultaneously operating the first saw with another spaced saw or selectively and simultaneously operating the second saw with another spaced saw, whereby bundles may have both ends sawn simultaneously to provide bundles of even or odd numbers of units of length.

16. In a device of the class described, bundle supporting means; electrically controlled bundle clamping means thereon; a plurality of longitudinally spaced swinging saws, the first two being spaced at a distance of one unit and the remainder being spaced at distances of even multiples of said unit; first stop means arresting longitudinal movement of a bundle at an operative position relative to the first of said longitudinally spaced saws; second stop means, movable into and out of bundle stopping positions, arresting longitudinal movement of a bundle in operative position relative to the second of said saws; selectively operable stop means moving said second stop means into and out of operative bundle stopping position; means for selectively operating the first saw with another spaced saw and the second saw with another spaced saw, whereby bundles may be sawn to even or odd units of length; electrical switch means operatively connected with said first and second stop means; and electrical control means for said bundle clamping means including said electrical switch means, whereby longitudinal movement of a bundle against a selected stop will align a bundle relative to selected saws and cause clamping of said bundle.

17. In a device of the class described, bundle rotor means mounted for intermittent rotary movement; circumferentially spaced bundle supporting means on said bundle rotor means for securely fixing a bundle as respects said rotor means, each of said bundle supporting means comprising a fixed support carried by said bundle rotor means, and clamp means movable toward and away from said fixed support into bundle clamping and unclamping positions; clamp operating means connected with each of said clamp means automatically unclamping each clamp during a predetermined portion of a revolution of said bundle rotor means; a plurality of swingingly mounted driven saws normally positioned out of bundle cutting position; saw stroking means for swingingly stroking saws through a bundle and returning them to normal position; and saw stroking control means positioned in the path of travel of a bundle carried by said bundle supporting means, determining by contact with a moving bundle the saws to be stroked, and operatively connecting said saw stroking means with saws, selected from said driven saws by said control means, when the rotor means is at rest.

18. In a device of the class described, bundle rotor means mounted for intermittent rotary movement; bundle supporting means on said bundle rotor means for securely fixing and aligning a bundle as respects said rotor means; a plurality of swingingly mounted driven saws normally positioned out of bundle cutting position; saw stroking means for swingingly stroking saws through a bundle and returning them to normal position; and saw stroking control means responsive to the length of a bundle to have its ends sawn and determining the saws to be stroked, and operatively connecting said saw stroking means with saws, selected from said driven saws by said control means, when the rotor means is at rest.

AUGUSTUS L. DE SPAIN.